United States Patent
Goto et al.

(10) Patent No.: US 7,268,296 B2
(45) Date of Patent: Sep. 11, 2007

(54) SLIDE WIRING APPARATUS

(75) Inventors: Hiroki Goto, Shizuoka (JP); Tomoyasu Terada, Shizuoka (JP); Katsuya Yoshimura, Shizuoka (JP); Tadashi Muraoka, Aichi-ken (JP); Hiroyuki Wakamatsu, Aichi-ken (JP); Hirofumi Wada, Aichi-ken (JP)

(73) Assignees: Yazaki Corporation, Tokyo (JP); Toyota Shatai Kabushiki Kaisha, Aichi (JP)

( * ) Notice: Subject to any disclaimer, the term of this patent is extended or adjusted under 35 U.S.C. 154(b) by 0 days.

(21) Appl. No.: 11/188,122

(22) Filed: Jul. 25, 2005

(65) Prior Publication Data

US 2006/0060370 A1    Mar. 23, 2006

(30) Foreign Application Priority Data

Jul. 23, 2004    (JP)    ............................ P2004-216553

(51) Int. Cl.
    *H02G 3/04*    (2006.01)

(52) U.S. Cl. ..................... 174/72 A; 174/68.1; 174/135
(58) Field of Classification Search .............. 174/72 A, 174/68.1, 135, 154
    See application file for complete search history.

(56) References Cited

U.S. PATENT DOCUMENTS 6,575,760 B2 *    6/2003    Doshita et al. ............... 439/34

FOREIGN PATENT DOCUMENTS

DE    10 2004 034 161 A1    3/2005

* cited by examiner

*Primary Examiner*—Jinhee Lee
(74) *Attorney, Agent, or Firm*—Sughrue Mion, PLLC

(57) ABSTRACT

A slide wiring apparatus is provided with a linearly-moving device. The linearly-moving device includes a casing portion, a rail and a protector. The casing portion is mounted on a floor serving as a vehicle body. The rail is accommodated within the casing portion, and is mounted on this casing portion. The protector is supported on the rail so as to move in a longitudinal direction thereof. The protector receives wires. A space within the casing portion is divided by the rail into a wire moving space and a wire accommodating space.

9 Claims, 16 Drawing Sheets

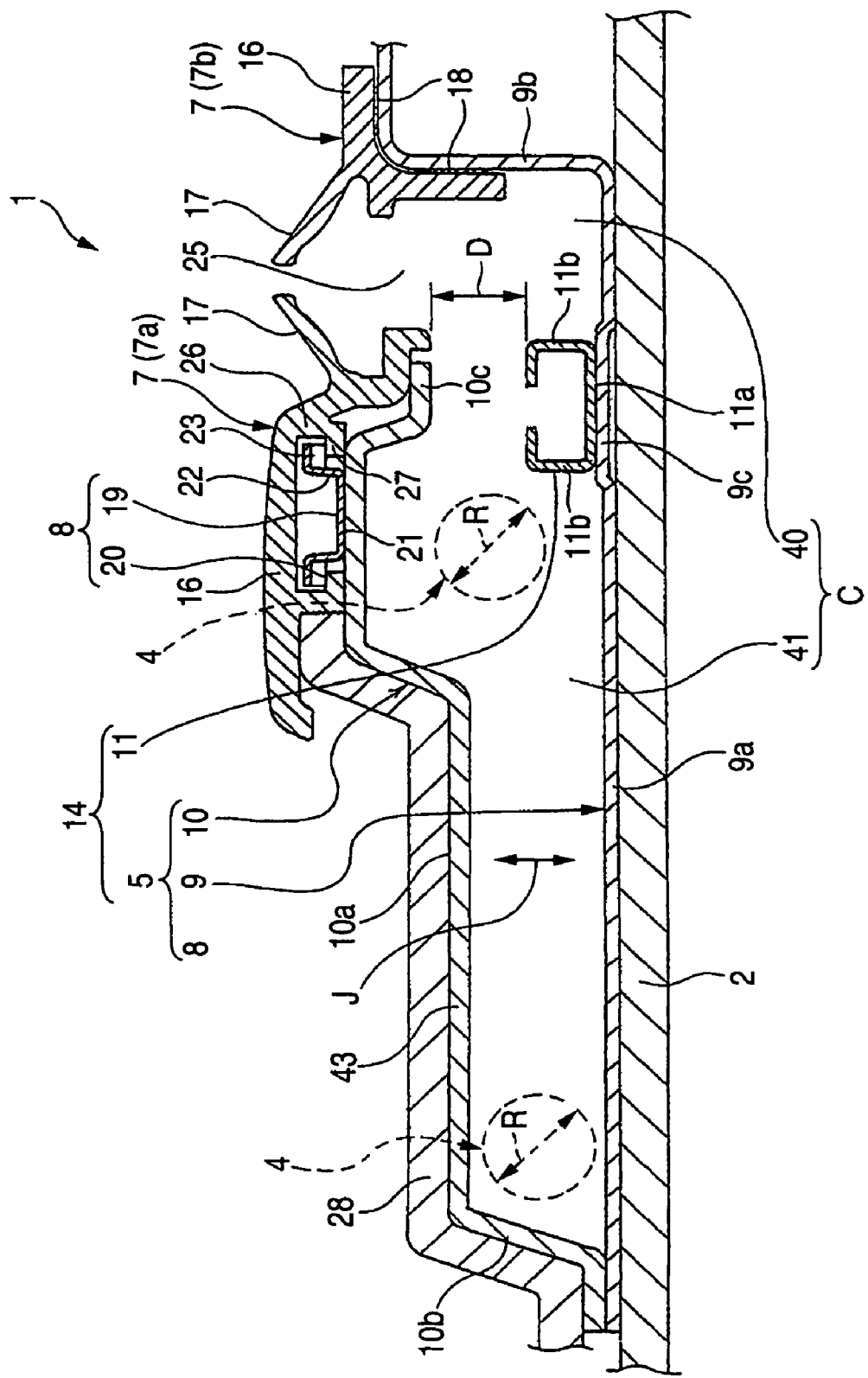

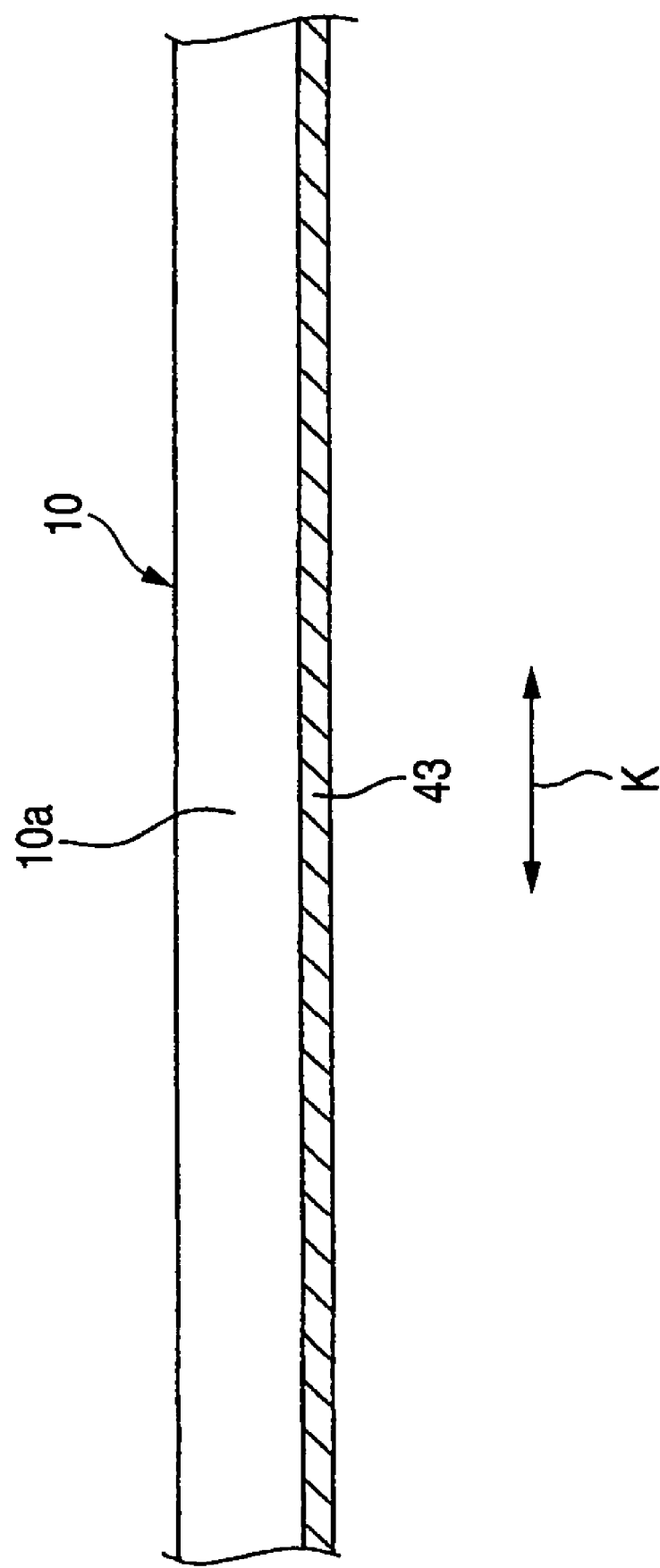

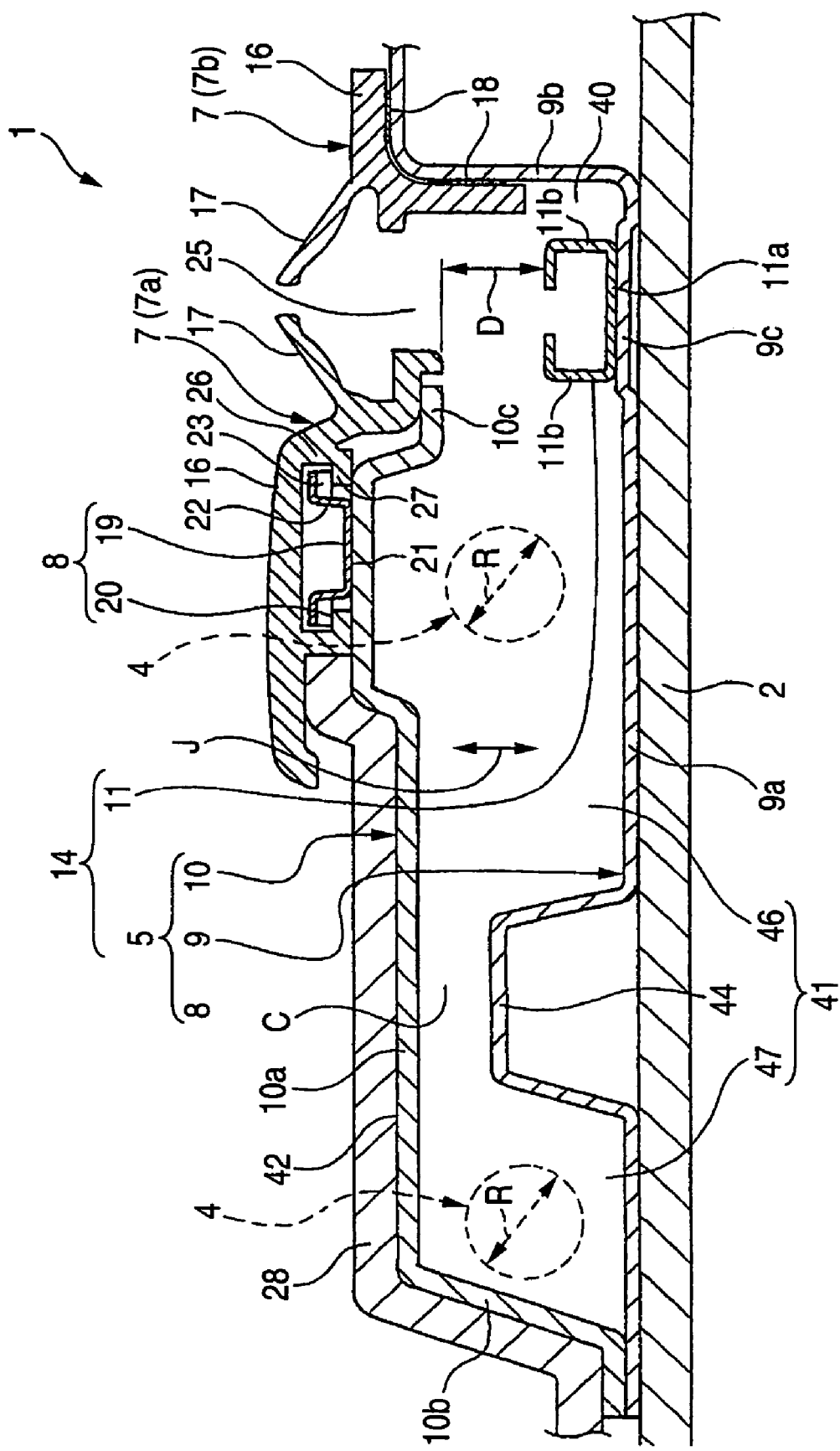

SLIDE WIRING APPARATUS

BACKGROUND OF THE INVENTION

1. Field of the Invention

This invention relates to a slide wiring apparatus for installing wires over a region including, for example, a vehicle body (such as a floor of an automobile) and a slide member (such as a seat) slidably mounted on the vehicle body.

2. Related Art

An automobile (moving body) is equipped with seats (slide bodies) slidable relative to a floor (vehicle body) of a passenger room. For example, a seat sensor for detecting or checking whether or not the passenger is seated is provided at the seat. Therefore, automobiles, equipped with slidable seats, have heretofore been provided with various slide wiring apparatuses.

Such a slide wiring apparatus comprises a casing portion, a rail, a protector (serving as a slider), and a cable (or wires) The casing portion is mounted on the floor. The rail is formed into a linear shape, and is accommodated within the casing portion, and is mounted on this casing portion. The protector is mounted on the rail so as to slide in a longitudinal direction of the rail. The protector is interlockingly movable to the seat. One end portion of the cable is accommodated within the casing portion, and the other end portion thereof is guided to the outside of the casing portion (that is, to the seat) by the protector.

The slide wiring apparatus is electrically connected by the cable to the seat sensor, mounted on the seat, and an ECU (Electronic Control Unit) or the like mounted on the vehicle body.

In the automobile equipped with the seat movable relative to the floor, it has been required to increase the amount of sliding movement of the seat. In the slide wiring apparatus which meets this requirement, the length of the cable naturally increases. Therefore, in the slide wiring apparatus, when the seat and hence the protector are repeatedly moved, there is a fear that the long cable, accommodated within the casing portion, catches the protector or other.

SUMMARY OF THE INVENTION

It is therefore an object of this invention to provide a slide wiring apparatus in which even when a slide member is repeatedly slid, wires, accommodated within a casing portion, are prevented from catching a slider.

In order to solve the above problem and also to achieve the above object, the invention provides a slide wiring apparatus for installing a wire over a region including a vehicle body of an automobile and a slide member slidably mounted on the vehicle body, characterized in that the apparatus comprises a casing portion for being mounted on the vehicle body; a rail which is accommodated within the casing portion, and is mounted on the casing portion; and a slider which is supported on the rail for sliding movement in a longitudinal direction of the rail, and can be interlockingly moved to the slide member, the wire being mounted on the slider; and a slit is formed in the casing portion, and extends in the longitudinal direction of the rail, and the slider, movably mounted on the rail, is guided to the outside of the casing body through the slit; and the slider guides the wire from the inside of the casing portion to the slide member through the slit; and a space within the casing portion is divided by the rail into a wire moving space disposed close to the slit and a wire accommodating space apart from the slit, and the wire interlockingly moves in the wire moving space to the slide member, and the wire is accommodated in the wire accommodating space.

The slide wiring apparatus of the invention is further characterized in that the rail is separate from the casing portion.

The slide wiring apparatus of the invention is further characterized in that the rail is mounted on a bottom surface of the casing portion, and that portion of the bottom surface on which the rail is mounted projects beyond the other portion thereof toward the slide member.

The slide wiring apparatus of the invention is further characterized in that the slider includes:

a body portion which holds the wire, and guides the wire from the inside of the casing portion to the slide member through the slit; and a projecting portion which is disposed between an inner wall surface of the casing portion (which is disposed to locate the slit between the inner wall surface and the rail) and the rail, and projects from the body portion toward the bottom surface of the casing portion.

The slide wiring apparatus of the invention is further characterized in that the slider includes a second projecting portion projecting from the body portion toward the inner wall surface of the casing portion.

The slide wiring apparatus of the invention is further characterized in that a distance between that portion of an inner surface of the casing portion (which is disposed between the wire moving space and the wire accommodating space, and is opposed to the rail) and the rail is smaller than an outer diameter of the wire.

The slide wiring apparatus of the invention is further characterized in that the casing portion includes a lower casing for being mounted on the vehicle body, and an upper casing attached to the lower casing; and the lower casing and the upper casing have superposing portions, respectively, which are superposed together, and are fixed to each other, and the superposing portions divide the wire accommodating space into a first space close to the wire moving space and a second space.

The slide wiring apparatus of the invention is further characterized in that spaced-apart portions and closer portions are alternately formed on an outer wall of the upper casing in the longitudinal direction of the rail, and the space-apart portions are spaced apart from the vehicle body, while the closer portions are disposed closer to the vehicle body than the spaced-apart portions are.

The slide wiring apparatus of the invention is further characterized in that a notch is formed in one of opposite side edge portions of the rail (which are spaced from each other in a direction of a width of the rail) at one end portion thereof.

The slide wiring apparatus of the invention is further characterized in that the slit and the rail are offset with each other in the direction of the width of the rail.

In the slide wiring apparatus of the invention, the rail divides the interior of the casing portion into the wire moving space and the wire accommodating space. Therefore, the wire is prevented from moving between the wire moving space and the wire accommodating space.

In the slide wiring apparatus of the invention, the rail is separate from the casing portion, and therefore the rail can be kept to high dimensional accuracy.

In the slide wiring apparatus of the invention of claim 3, the portion of the bottom surface of the casing portion on which the rail is mounted is disposed closer to the slide member than the other portion thereof is. Therefore, a foreign matter, intruding into the interior of the casing portion through the slit, is positively located at the other portion without fail.

In the slide wiring apparatus of the invention, the projecting portion of the slider is disposed between the rail and the inner wall surface of the casing portion, and projects toward the bottom surface. Therefore, a foreign matter which intrudes into the interior of the casing portion, and tends to intrude between the slider and the rail interferes with the projecting portion.

In the slide wiring apparatus of the invention, the second projecting portion of the slider projects toward the inner wall surface of the casing portion. Therefore, a foreign matter, intruding into the interior of the casing portion through the slit, interferes with the second projecting portion, and is positively kept away from the slider.

In the slide wiring apparatus of the invention, the distance between the rail and the inner surface of the casing portion is smaller than the outer diameter of the wire, and therefore the wire is positively prevented from moving between the wire moving space and the wire accommodating space.

In the slide wiring apparatus of the invention, the superposing portions of the lower casing and upper casing divide the wire accommodating space into the first space and the second space. Therefore, the wire within the wire accommodating space is prevented from being displaced in the direction of the width of the rail to move between the first space and the second space.

In the slide wiring apparatus of the invention, the spaced-apart portions and the closer portions are alternately formed on the outer wall of the upper casing, and therefore the rigidity of the upper casing (that is, the casing portion) is enhanced.

In the slide wiring apparatus of the invention, the notch is formed in the one end portion of the rail. Therefore, the slider can be easily mounted on the rail through the notch. And besides, the notch is formed in one of the widthwise-spaced opposite side edge portions of the rail, and therefore the remaining portion of the rail can prevent the movement of sand and a liquid such as water.

In the slide wiring apparatus of the invention, the slit and the rail are offset with each other in the direction of the width of the rail. Therefore, a foreign matter, intruding into the interior of the casing portion through the slit, is prevented from being superposed on the rail. Even when a foreign matter such as a walking stick intrudes into the interior of the casing portion, this foreign matter is prevented from coming into contact with the rail, and therefore the rail is prevented from being deformed or broken.

As described above, the wire is prevented from moving between the wire moving space and the wire accommodating space. Therefore, the wire is prevented from catching the slider or other.

Further, the rail is separate from the casing portion, and therefore the rail can be kept to high dimensional accuracy.

Further, a foreign matter, intruding into the interior of the casing portion through the slit, is located at the other portion without fail. This positively prevents a situation in which the foreign matter, intruding into the interior of the casing portion, prevents the movement of the slider.

Further, a foreign matter which intrudes into the interior of the casing portion, and tends to intrude between the slider and the rail interferes with the projecting portion. Therefore, the foreign matter, intruding into the interior of the casing portion, is prevented from being held between the slider and the rail, and this positively prevents a situation in which the movement of the slider is prevented.

Further, a foreign matter, intruding into the interior of the casing portion through the slit, interferes with the second projecting portion, and is positively kept away from the slider. This positively prevents a situation in which the foreign matter, intruding into the interior of the casing portion, prevents the movement of the slider.

Further, the distance D between the rail and the inner surface of the casing portion is smaller than the outer diameter of the wire, and therefore the wire is positively prevented from moving between the wire moving space and the wire accommodating space. Therefore, the wire is prevented from catching the slider or other.

Further, the superposing portions of the lower casing and upper casing divide the wire accommodating space into the first space and the second space. Therefore, the wire within the wire accommodating space is prevented from being displaced in the direction of the width of the rail to move between the first space and the second space. Therefore, the wire is prevented from being entangled within the wire accommodating space, thereby positively preventing the wire from being damaged.

Further, the spaced-apart portions and the closer portions are alternately formed on the outer wall of the upper casing, and therefore the rigidity of the upper casing (that is, the casing portion) is enhanced.

Further, the notch is formed in the one end portion of the rail. Therefore, the slider can be easily mounted on the rail through the notch. And besides, the notch is formed in one of the widthwise-spaced opposite side edge portions of the rail, and therefore the remaining portion of the rail can prevent the movement of sand and a liquid such as water.

Further, the slit and the rail are offset with each other in the direction of the width of the rail. Therefore, a foreign matter, intruding into the interior of the casing portion through the slit, is prevented from being superposed on the rail. This still more positively prevents a situation in which the foreign matter, intruding into the interior of the casing portion, prevents the movement of the slider. Even when a foreign matter such as a walking stick intrudes into the interior of the casing portion through the slit, this foreign matter is prevented from coming into contact with the rail, and therefore the rail is prevented from being deformed or broken.

BRIEF DESCRIPTION OF THE DRAWINGS

FIG. 16 is a cross-sectional view showing an important portion of a further modified example of the slide wiring apparatus of FIG. 3;

FIG. 17 is a cross-sectional view showing a modified example of an upper casing of the slide wiring apparatus of FIG. 6; and FIG. 18 is a cross-sectional view showing an important portion of a further modified example of the slide wiring apparatus of FIG. 3.

DETAILED DESCRIPTION OF THE PREFERRED EMBODIMENTS

Figure 1:
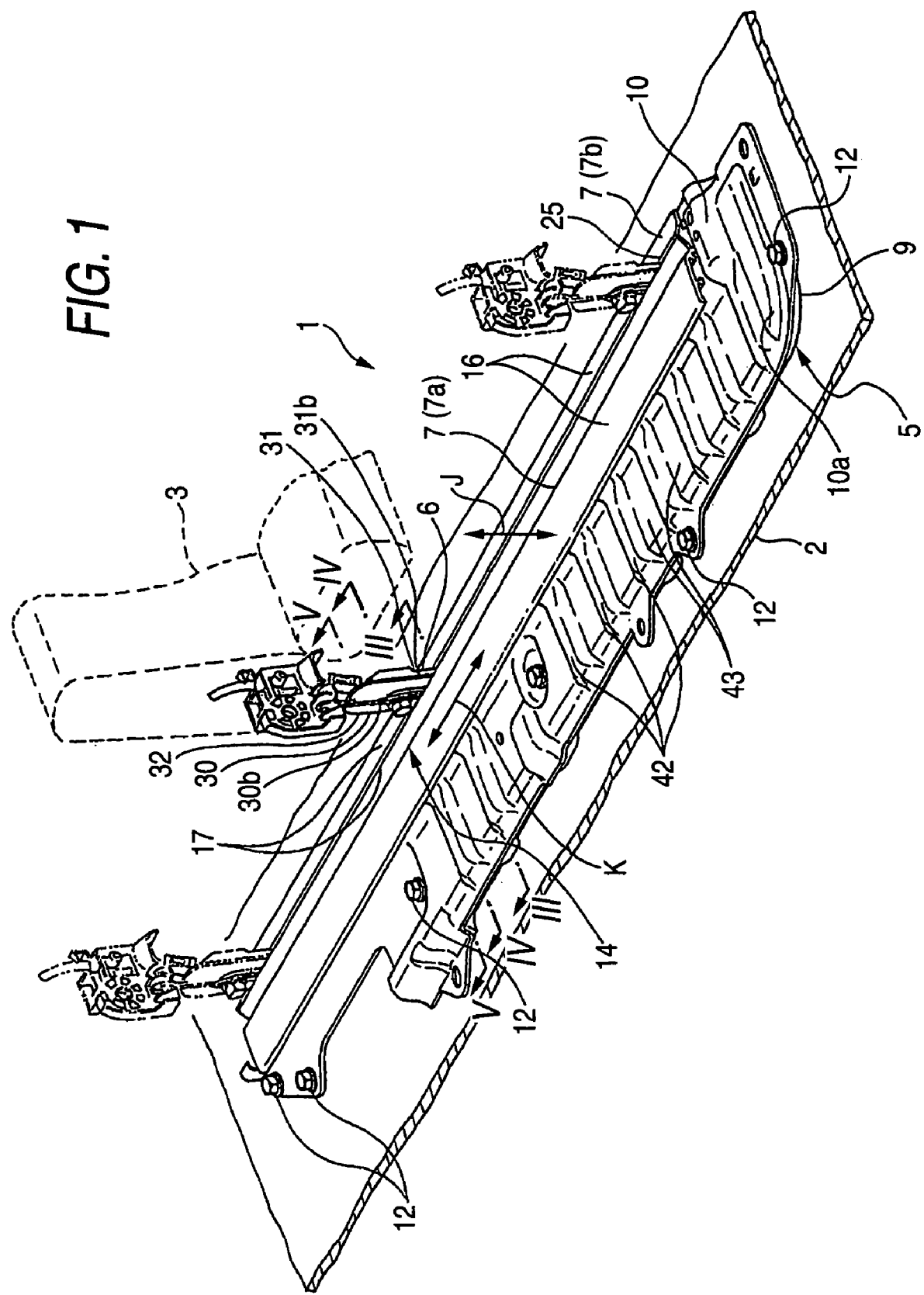
FIG. 1 is a perspective view of one preferred embodiment of a slide wiring apparatus of the present invention, showing its construction.

One preferred embodiment of a slide wiring apparatus 1 of the present invention will now be described with reference to FIGS. 1 to 11. As shown in FIG. 1, the slide wiring apparatus 1 (hereinafter referred to merely as "wiring apparatus") is designed to install wires 13 (shown in FIGS. 9 and 10) over a region including a floor 2 (serving as a vehicle body of an automobile) of a passenger room and a seat 3 (serving as a slide member) mounted on the floor 2 for sliding movement in a direction of arrow K Each of the wires 13 is a so-called sheathed wire comprising an electrical conductor, and an insulating sheath. The plurality of wires 13 are bundled together, and are passed through a corrugated tube 4 (shown in FIG. 2). The corrugated tube 4 is made of a synthetic resin such for example as PP (polypropylene), and is formed into a tubular shape. The corrugated tube 4 is also formed into a bellows-shape. The plurality of wires 13 are passed through the corrugated tube 4, and therefore are protected by this corrugated tube 4.

In the illustrated example, the seat 3 can be slidingly moved between a position indicated in a dot-and-dash line (FIG. 1) and a position indicated in a dots-and-dash line in the direction of arrow K. The direction of arrow K is linear. Electronic equipments (not shown), such as a seat sensor and a seat belt sensor, are provided at the seat 3. The seat sensor detects or checks whether or not the passenger is seated on the seat 3. The seat belt sensor detects or checks whether or not the passenger, seated on the seat 3, wears a seat belt. Information, detected by the sensors, are sent to various ECUs (Electronic Control Units) mounted on the vehicle body or others.

Figure 2:
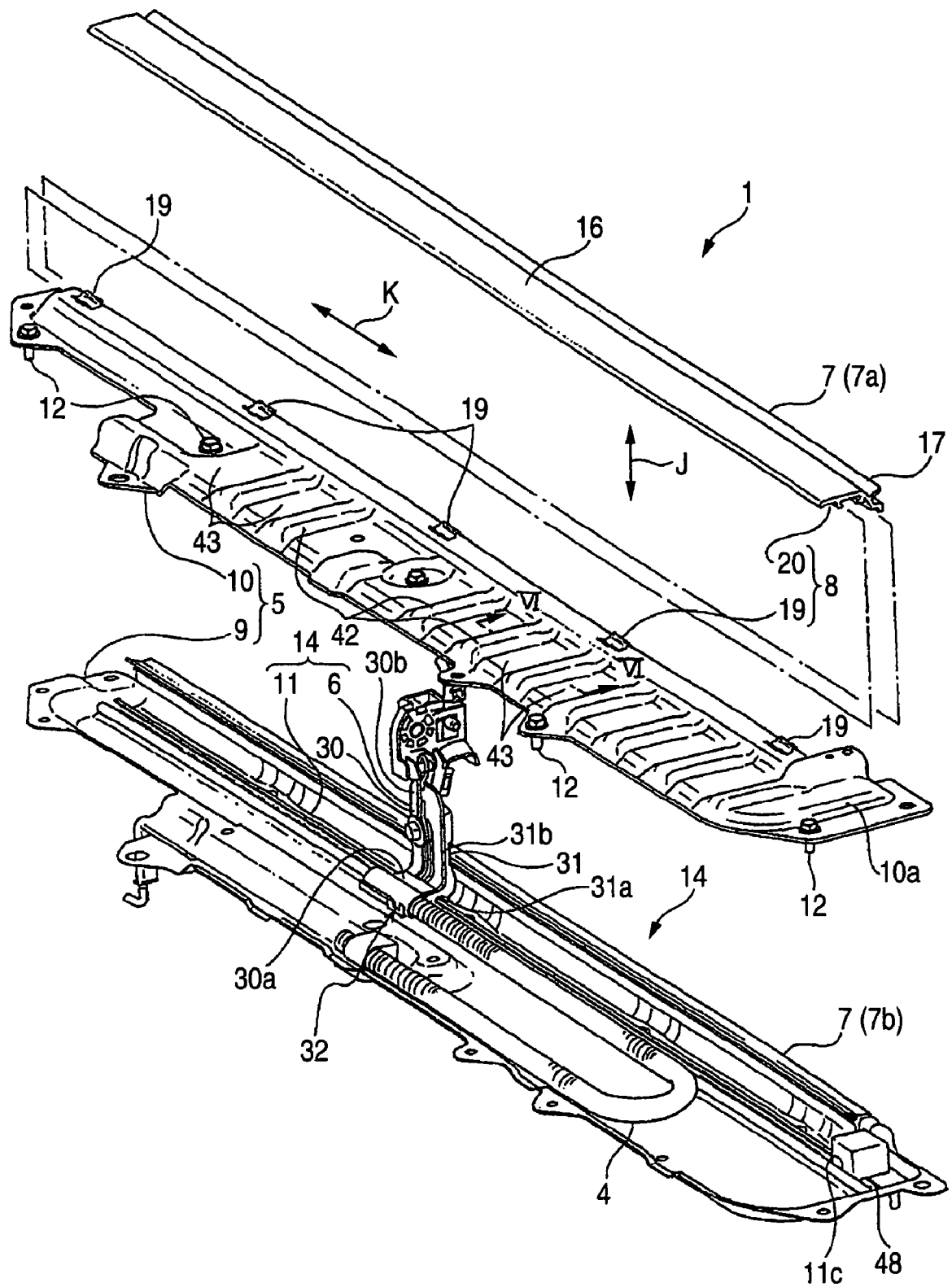
FIG. 2 is a partly-exploded, perspective view of the slide wiring apparatus of FIG. 1.
Figure 3:
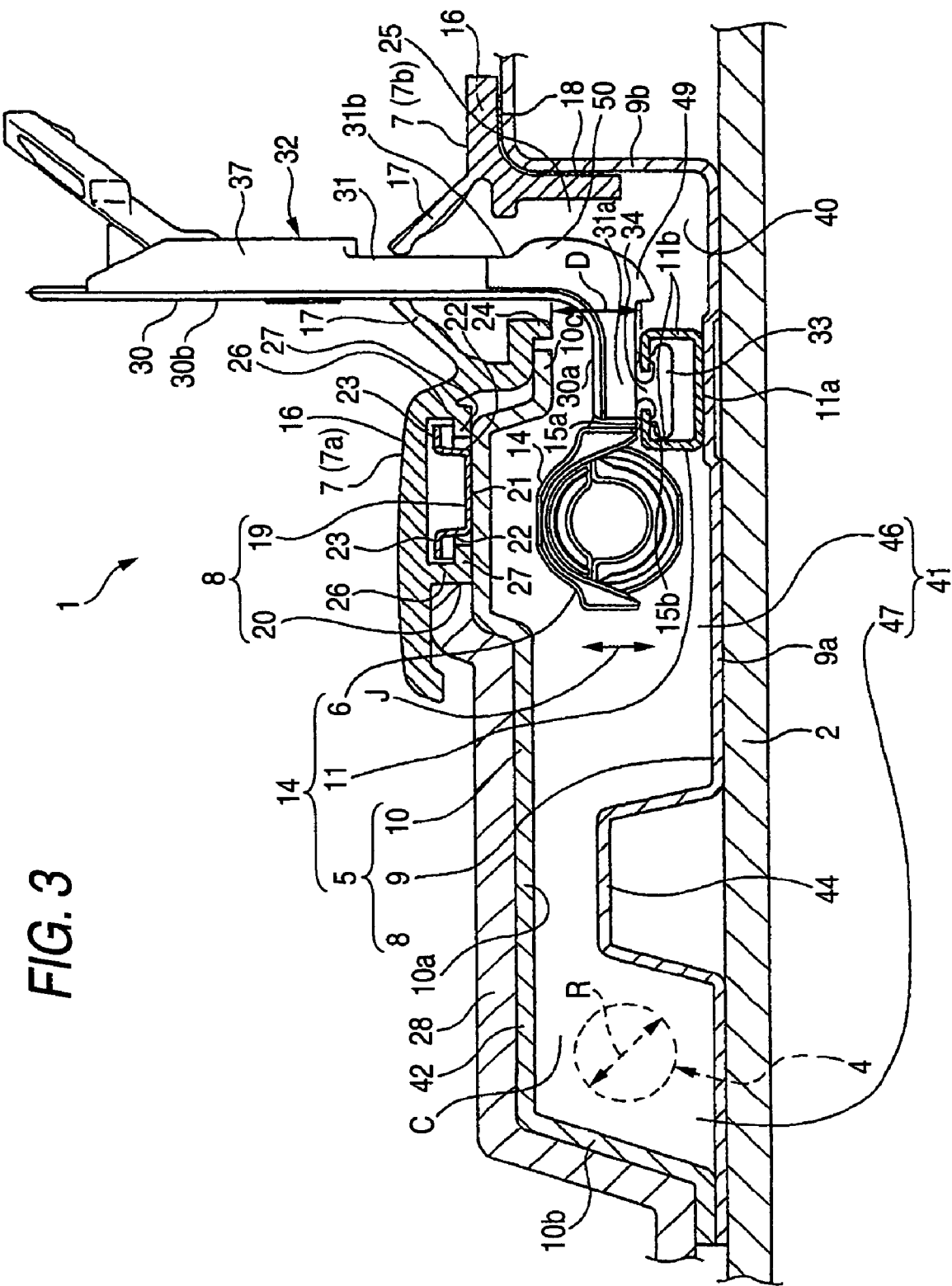
FIG. 3 is a cross-sectional view taken along the line III-III of FIG. 1.

As shown in FIGS. 1 and 2, the wiring apparatus 1 includes a linearly-moving device 14. As shown in FIG. 3, the linearly-moving device 14 comprises a casing portion 5, a rail 11, and a protector 6 (serving as a slider). As shown in FIGS. 1 to 5, the casing portion 5 includes a lower casing 9, an upper casing 10, a pair of laces 7 (serving as decorative members), and a fixing mechanism 8 (shown in FIG. 3 and others).

The lower casing 9 and the upper casing 10 are connected together to form the casing (recited in the present specification) accommodating the rail 11. The lower casing 9 is formed of a metal sheet, and has a generally rectangular shape when viewed from the top, and extends long in a direction parallel to the direction of arrow K. The lower casing 9 includes a flat plate-like bottom plate portion 9a, and an inner edge wall 9b extending upright from an edge of the bottom plate portion 9a. The bottom plate portion 9a is laid on the floor 2. The bottom plate 9a defines a bottom surface recited in the present specification. The inner edge wall 9b of the lower casing 9 defines an inner wall surface (recited in the present specification) of the casing portion 5 which is disposed to locate a slit 25 (described later) between this inner wall surface and the rail 11. The inner edge wall 9b extends upright from the edge of the bottom plate portion 9a disposed at the inner side of the passenger room. The longitudinal direction of the bottom plate portion 9a, as well as the longitudinal direction of the inner edge wall 9b, is parallel to the direction of arrow K.

The upper casing 10 is formed of a relatively thick metal sheet, and has a generally rectangular shape when viewed from the top, and extends long in a direction parallel to the direction of arrow K. The upper casing 10 includes a flat plate-like top wall portion 10a, and an outer edge wall 10b extending generally perpendicularly from an edge of the top wall portion 10a. The top wall portion 10a is disposed in parallel spaced relation to the bottom plate portion 9a. The top wall portion 10 defines an outer wall of the upper casing 10 recited in the present specification. The outer edge wall 10b extends generally perpendicularly from the edge of the top wall portion 10a disposed at the outer side of the passenger room. The longitudinal direction of the top wall portion 10a, as well as the longitudinal direction of the outer edge wall 10b, is parallel to the direction of arrow K.

The upper casing 10 and the lower casing 9 are fixed to each other in such a manner that the outer edge wall 10b is laid at its lower end on the edge portion of the bottom plate portion 9a (of the lower casing 9) disposed at the outer side of the passenger room and that the top wall portion 10a is spaced from the bottom plate portion 9a. The upper casing 10 and the lower casing 9 (that is, the casing portion 5) are fixed to the floor 2 by bolts 12 (shown in FIG. 2) or the like. Thus, the casing portion 5 is mounted on the floor 2 serving as the vehicle body. When the upper casing 10 and the lower casing 9 are fixed together, and are mounted on the floor 2, the inner edge of the upper casing 10, disposed at the inner side of the passenger room, is spaced from the inner edge wall 9b of the lower casing 9.

The rail 11 (described later) of the linearly-moving device 14 is mounted on the lower casing 9 of the above construction in such a manner that a bottom plate portion 11a of the rail 11 is laid on the bottom plate portion 9a of the lower casing 9. Then, the upper casing 10 and the lower casing 9 are fixed together, and are mounted on the floor 2 in such a manner that the outer edge wall 10b of the upper casing 10 is laid at its lower end on the outer edge portion of the lower casing 9 and that the top wall portion 10a of the upper casing 10 is disposed in parallel spaced relation to the bottom plate portion 9a of the lower casing 9. In this condition, the longitudinal directions of the upper casing 10, lower casing 9 and rail 11 are parallel to one another, and are parallel to the direction of arrow K. Therefore, the direction of arrow K is the longitudinal direction of the rail 11 recited in the present invention.

Figure 4:
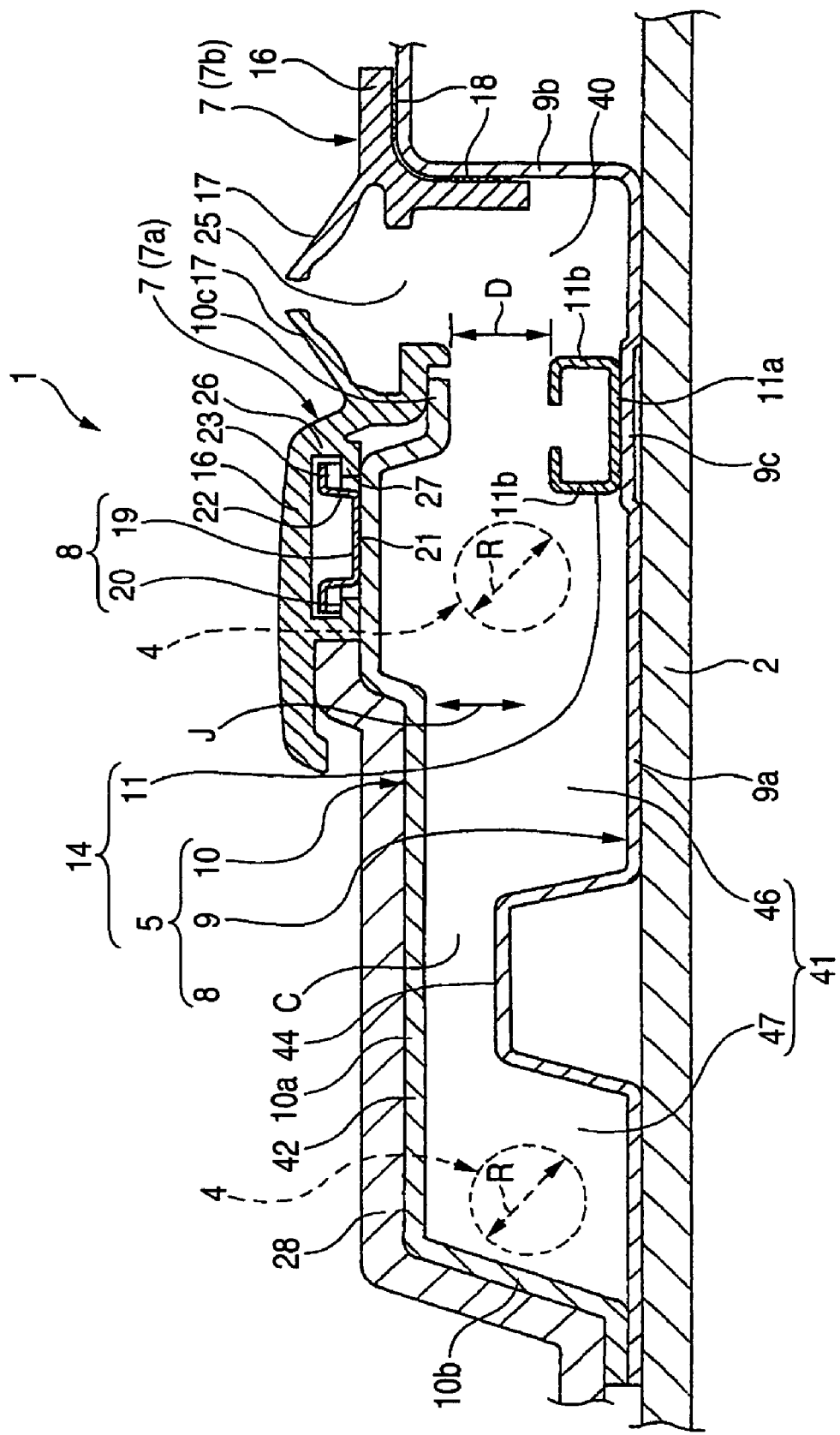
FIG. 4 is a cross-sectional view taken along the line IV-IV of FIG. 1.
Figure 5:
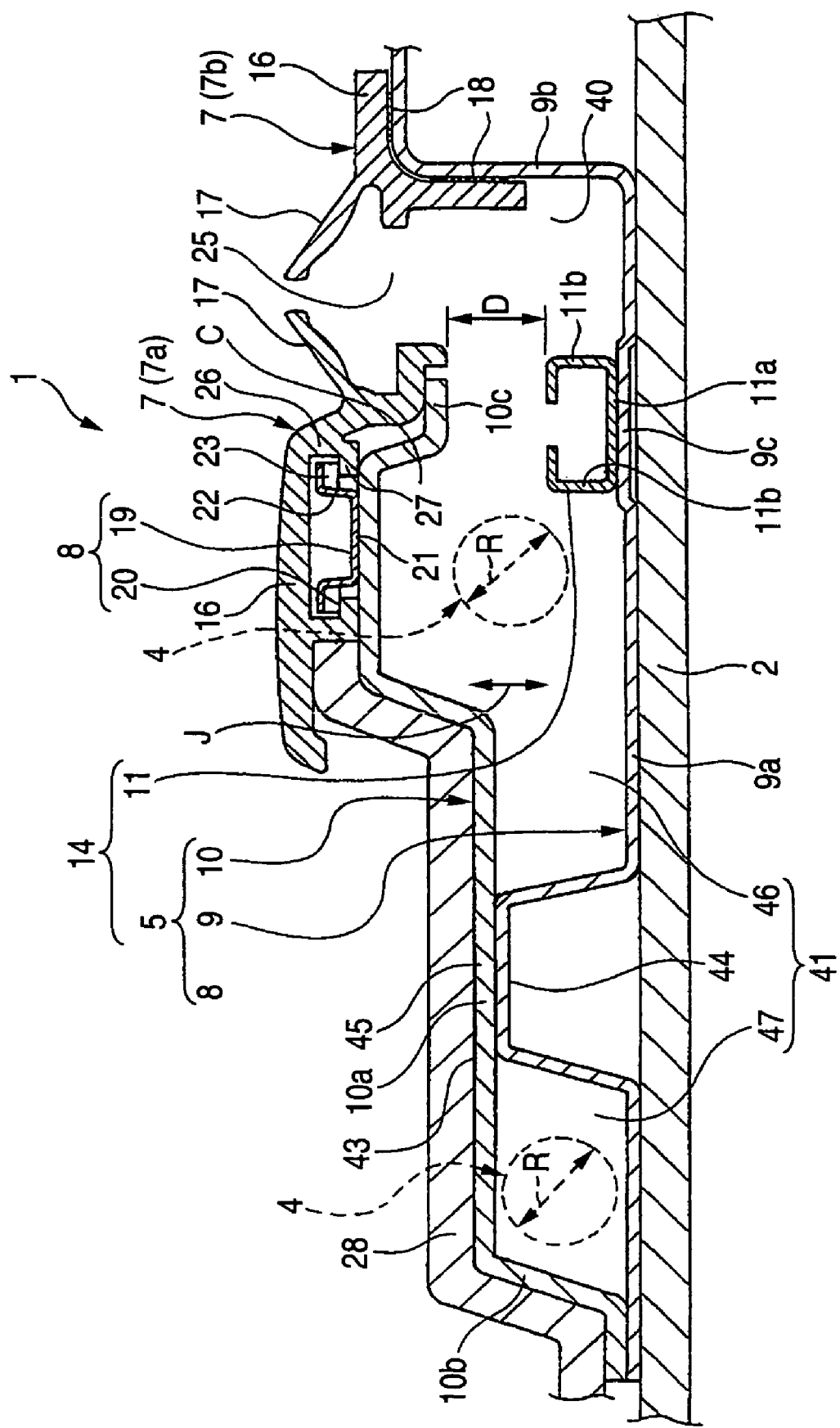
FIG. 5 is a cross-sectional view taken along the line V-V of FIG. 1.

That portion 9c of the bottom plate portion 9a (of the lower casing 9) on which the rail 11 is laid projects beyond the other portion thereof toward the seat 3 as shown in FIGS. 3 to 5. This portion 9C extends linearly in the longitudinal directions of the rail 11 and casings 9 and 11. An upper surface of the portion 9c is made flat.

The casing portion 5 has an internal space C, and that portion of the space C, extending from the portion 9C toward the slit 25, is called a wire moving space 40. That portion of the space C, extending from the portion 9c in a direction away from the slit 25, is called a wire accommodating space 41. The casing portion 5 allows the wires 13 to move interlockingly, together with the projector 6, in the wire moving space 40, to the seat 3. The wires 13, covered with the corrugated tube 4, are accommodated within the wire accommodating space 41 of the casing portion 5.

Figure 6:
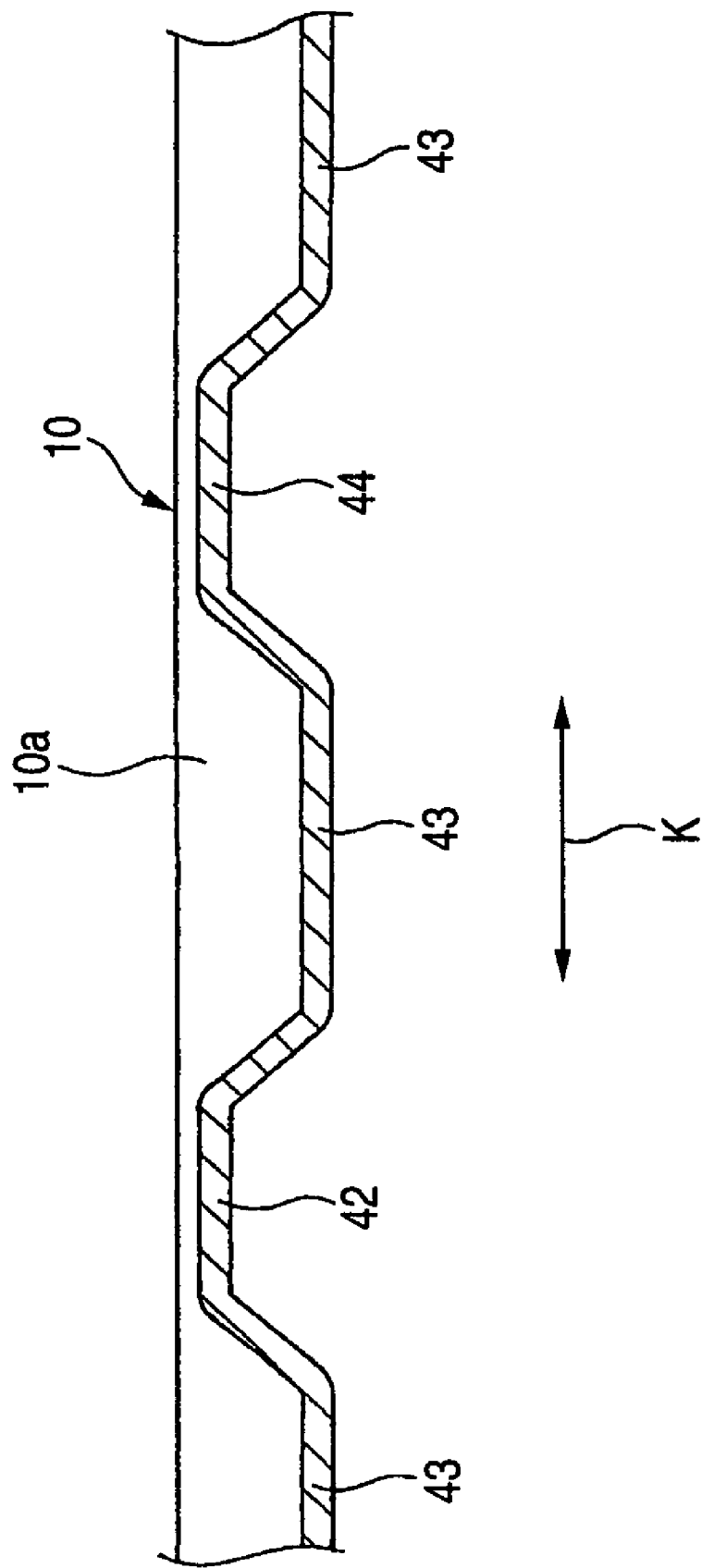
FIG. 6 is a cross-sectional view taken along the line VI-VI of FIG. 2.

As shown in FIG. 6, spaced-apart portions 42 and closer portions 43 are alternately formed on the top wall portion 10a of the upper casing 10 in the longitudinal directions of the casing portion 5 and rail 11 (that is, in the direction of arrow K). The space-apart portions are spaced apart from the bottom plate portion 9a of the lower casing 9, that is, from the floor 2. The closer portions 43 are disposed closer to the bottom plate portion 9a of the lower casing 9 (that is, to the floor 2) than the spaced-apart portions 42 are.

As shown in FIG. 5, the lower casing 9 and the upper casing 10 include superposing portions 44 and 45, respectively, which are superposed together within the wire accommodating space 41. The superposing portions 44 and 45 extend linearly in the longitudinal directions of the casing portion 5 and rail 11 (that is, in the direction of arrow K). The superposing portion 44 of the lower casing 9 projects from the bottom plate portion 9a toward the upper casing 10. The superposing portion 45 of the upper casing 10 is disposed flush with the closer portions 43 of the top wall portion 10a, and is part of the closer portions 43. The superposing portions 44 and 45 extend from the rear-side end portion (in FIG. 2) of the casing portion 5 to a central portion thereof in the longitudinal direction. The lower casing 9 and the upper casing 10 are welded together at the superposing portions 44 and 45, and therefore are fixed to each other.

The wire accommodating space 41 is divided by the superposing portions 44 and 45 into a first space 46 close to the wire moving space 40 and a second space 47 apart from the wire moving space 40. The first space 46 and the second space 47 communicate with each other at the front-side end portion (in FIG. 2) of the casing portion 5. One end portion of the corrugated tube 4, disposed near to the floor 2, is accommodated within the second space 47 of the wire accommodating space 41, and a central portion of the corrugated tube 4 passes through the interior of the front-side end portion (in FIG. 2) of the casing portion 5, and the other end portion of the corrugated tube 4, disposed near to the seat 3, is accommodated within the first space 46. The lower casing 9 fixes the one end portion of the corrugated tube 4 within the second space 47 of the wire accommodating space 41.

The pair of laces 7 are made of a synthetic resin, and are formed into a plate-like shape. The pair of laces 7 are laid on the casing portion 5 in such a manner that their longitudinal direction is parallel to the direction of arrow K. The pair of laces 7 are spaced from each other in a direction which is parallel to the surface of the floor 2, and is perpendicular to the direction of arrow K. Vertical portions 30b and 31b (described later) of the protector 6 are located between the pair of laces 7.

As shown in FIG. 3 and others, each of the pair of laces 7 includes a flat plate-like body portion 16 for being laid on the casing portion 5, and an elastically-deformable contact piece portion 17 extending upwardly from the body portion 16 so as to contact the vertical portion 30b, 31b of the protector 6, the body portion 16 and the contact piece portion 17 being formed integrally with each other. The contact piece portions 17 of the pair of laces 7, when not contacted respectively with the vertical portions 30b and 31b of the protector 6, contact each other to cover the inner edge of the upper casing 10 and the inner edge wall 9b of the lower casing 9, thereby preventing foreign matters and so on from intruding therebetween.

One (hereinafter designated by reference numeral 7a) of the pair of laces 7 which is disposed at the left side in FIGS. 1 to 3 is secured to the upper casing 10 by the fixing mechanism 8.

The other lace 7 (hereinafter designated by reference numeral 7b) which is disposed at the right side in FIGS. 1 to 3 is secured to the inner edge wall 9b of the lower casing 9 by an adhesive double coated tape 18 (shown in FIG. 3) or the like. Thus, the laces 7a and 7b are secured to the casing portion 5 in such a manner that their body portions 16 are laid on the casing portion 5 in a direction of arrow J. The direction of arrow J is perpendicular to the surface of the floor 2, and is a vertical direction in the illustrated example. Therefore, the direction of arrow J is, of course, perpendicular to the direction of arrow K.

The fixing mechanism 8 includes fixing members 19 (shown in FIG. 3 and others), and fixing portions 20 formed integrally on the one lace 7a.

As shown in FIG. 3, the fixing member 19 includes a flat plate-like bottom plate portion 21 (which is laid on the upper surface of the upper casing 10 of the casing portion 5, and is mounted on the upper casing 10), upstanding portions 22 formed on and projecting upwardly from the bottom plate portion 21, and extension portions 23 extending outwardly respectively from upper edges (apart from the bottom plate portion 21) of the upstanding portions 22.

The bottom plate portion 21 has a rectangular shape when viewed from the top. A longitudinal direction of the bottom plate portion 21 is parallel to the direction of arrow K. The upstanding portions 22 project upwardly respectively from opposite side edges of the bottom plate portion 21 (spaced from each other in a direction of a width of the bottom plate portion 21 which is perpendicular to the direction of arrow K) toward the lace 7a. The extension portions 23 extend respectively from the upper edges of the upstanding portions 22 in parallel relation to the upper surface of the upper casing 10 (and hence the upper surface of the casing portion 5) in a direction perpendicular to the direction of arrow K, and therefore project outwardly from the fixing member 19.

The fixing members 19 of the above construction are mounted on the upper surface of the upper casing 9 (that is, the upper surface of the casing portion 5), and are spaced from one another in the direction of arrow K in such a manner that the longitudinal direction of the bottom plate portion 21 of each fixing member 19 is along the direction of arrow K. Since the longitudinal direction of the bottom plate portion 21 of the fixing member 19 is along the direction of arrow K, the fixing member 19 extends linearly in a direction perpendicular to the direction of arrow J.

The fixing portion 20 includes a pair of second upstanding portions 26 formed on and projecting perpendicularly from the body portion 16 of the lace 7a, and a pair of second extension portions 27 extending respectively from lower edges (apart from the body portion 16 of the lace 7a) of the second upstanding portions 26 toward each other.

The pair of second upstanding portions 26 are spaced from each other in the direction of the width of the bottom plate portion 21 of the fixing member 19 (that is, in the direction perpendicular to the direction of arrow K). The pair of second upstanding portions 26 are disposed parallel to each other. The fixing member 19 is located between the pair of second upstanding portions 26. The second upstanding portions 26 project perpendicularly from the body portion 16 of the lace 7a toward the upper casing 10 (that is, the casing portion 5).

The second extension portions 27 extend respectively from the lower edges of the second upstanding portions 26 along the upper surface of the lower casing 9 (that is, the casing portion 5).

The fixing portion 20 (and hence the second upstanding portions 26 and the second extension portions 27) extends linearly in the direction of arrow K. Namely, the fixing portion 20 extends linearly in a direction perpendicular to the direction of arrow J.

In the fixing mechanism 8 of the above construction, the lace 7a is slid relative to the upper casing 10 (that is, the casing portion 5) in the direction of arrow K perpendicular to the direction of arrow J, and by doing so, the fixing portions 20 are engaged respectively with the fixing members 19 provided at the upper casing 10 and spaced from one another therealong. More specifically, each second extension portion 27 of each fixing portion 20 is located between the extension portion 23 of the corresponding fixing member 19 and the casing portion 5, while each extension portion 23 is located between the second extension portion 27 and the body portion 16 of the lace 7a. Then, the lace 7a is fixed to the upper casing 10 (that is, the casing portion 5).

The casing portion 5 has the slit 25 formed between the one lace 7a and the other lace 7b, and the outside and inside of the casing portion 5 communicate with each other through the slit 25. The slit 25 extends linearly in the longitudinal directions of the laces 7a and 7b and casings 9 and 11 (that is, in the longitudinal directions of the casing portion 5 and rail 11) and hence in the direction of arrow K. The protector 6 extends from the inside of the casing portion 5 to the outside thereof (that is, toward the seat 3) through the slit 25.

The rail 11 is made of a metal sheet, and is separate from the lower casing 9 (that is, the casing portion 5). The rail 11 has a generally rectangular shape when viewed from the top, and extends long in a direction parallel to the direction of arrow K. The rail 11 includes a flat plate-like bottom plate portion 11a, and a pair of hook walls 11b formed on and projecting upwardly respectively from opposite side edges of the bottom plate portion 11a (spaced from each other in a direction of a width of the bottom plate portion 11a which is perpendicular to the direction of arrow K).

The bottom plate portion 11a is laid on the bottom plate portion 9a of the lower casing 9, and is fixed to this bottom plate portion 9a by welding or the like. Therefore, the rail 11 is mounted on the floor 2 via the lower casing 9. The pair of hook walls 11b first extend linearly upwardly respectively from the widthwise-spaced opposite side edges of the bottom plate portion 11a in parallel relation to each other, and then extend toward each other in parallel relation to the bottom plate portion 11a, each hook wall 11b having a hook-shaped cross-section. The longitudinal direction of the rail 11 (that is, the direction of arrow K) is parallel to the longitudinal directions of the upper casing 10 and lower casing 9. The direction of arrow K is parallel to the direction of sliding movement of the seat 3.

The rail 11 is offset with the slit 25 in the direction of the width thereof. Namely, the rail 11 and the slit 25 are offset with each other in the direction of the width of the rail 11.

Figure 7:
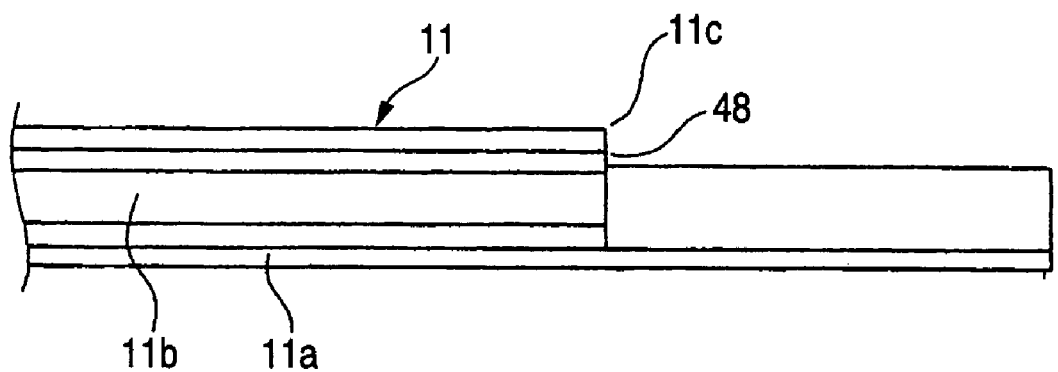
FIG. 7 is a plan view showing one end portion of a rail of the slide wiring apparatus of FIG. 2.
Figure 8:
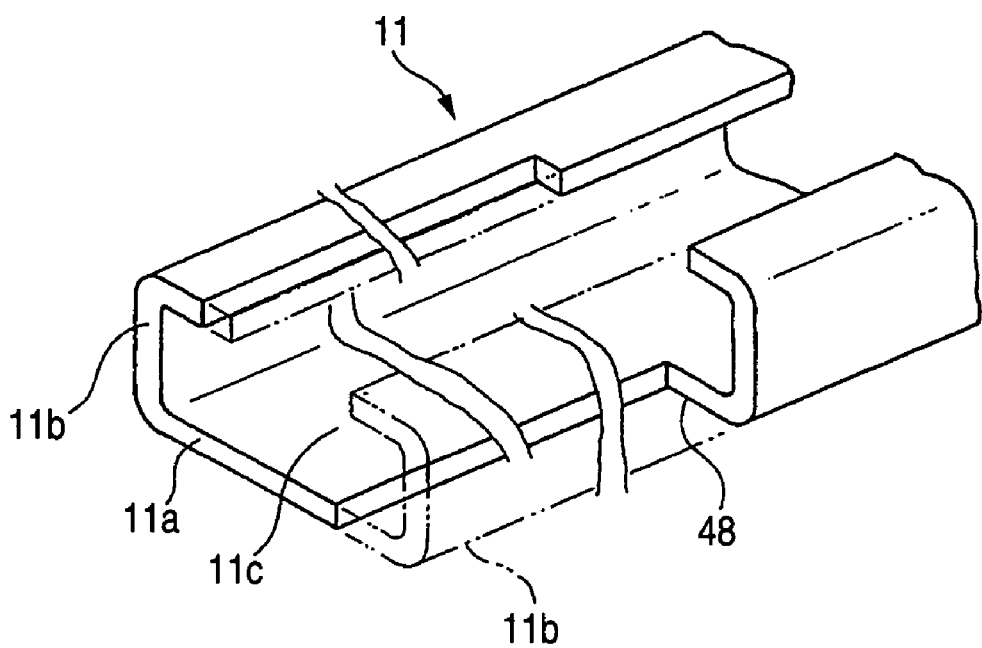
FIG. 8 is a perspective view showing the one end portion of the rail shown in FIG. 7.

As shown in FIGS. 7 and 8, a notch 48 is formed in one end portion (front-side end portion in FIG. 2) 11c of the rail 11. As indicated in dots-and-dash lines in FIG. 8, the notch 48 is formed by cutting or removing, at the one end portion 11c, the hook wall 11b close to the slit 25, an edge portion of the bottom plate portion 11a close to the slit 25, and an edge portion of the other hook wall 11b (apart from the slit 25) close to the slit 25. Thus, the slit 48 is formed by cutting one side edge portion of the one end portion 11c of the rail 11 close to the slit 25.

The rail 11 partitions the internal space of the casing portion 5 into the wire moving space 40 close to the slit 25 and the wire accommodating space 41 apart from the slit 25. A distance D between the rail 11 and an inner surface of an inner edge portion 10c of the upper casing 10 (which is close to the slit 25, and is opposed to the rail 11) is smaller than an outer diameter R of the corrugated tube 4 as shown in FIGS. 3 to 5. The inner surface of the edge portion 10c of the upper casing 10 is disposed between the wire moving space 40 and the wire accommodating space 41. The inner surface of the edge portion 10c of the upper casing 10 defines an inner surface of the casing portion 5 (which is opposed to the rail 11) recited in the present specification. The outer diameter R of the corrugated tube 4 defines an outer diameter of a wire recited in the present specification.

Figure 9:
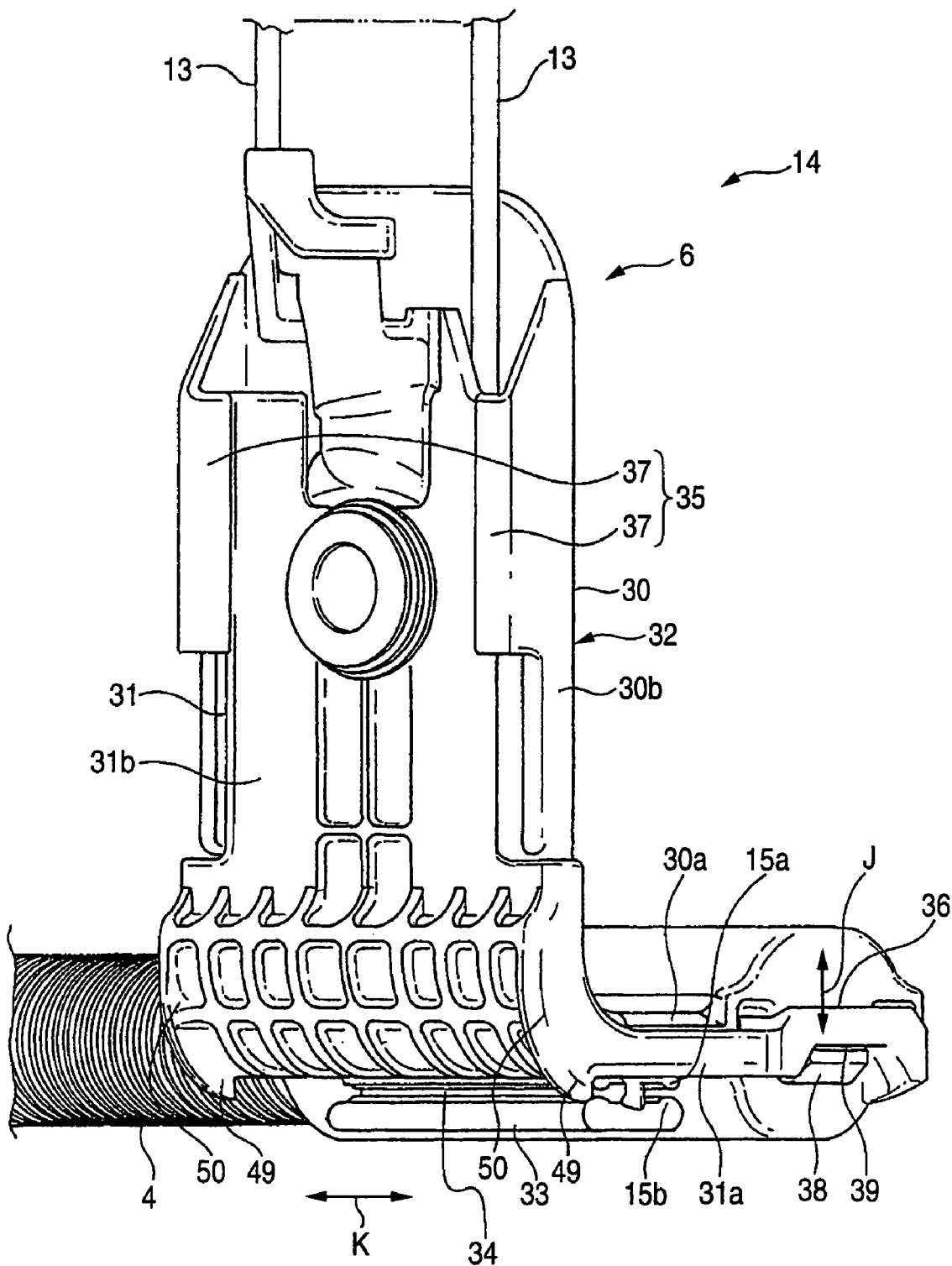
FIG. 9 is a perspective view of a protector of a linearly-moving device of the slide wiring apparatus of FIG. 1.
Figure 10:
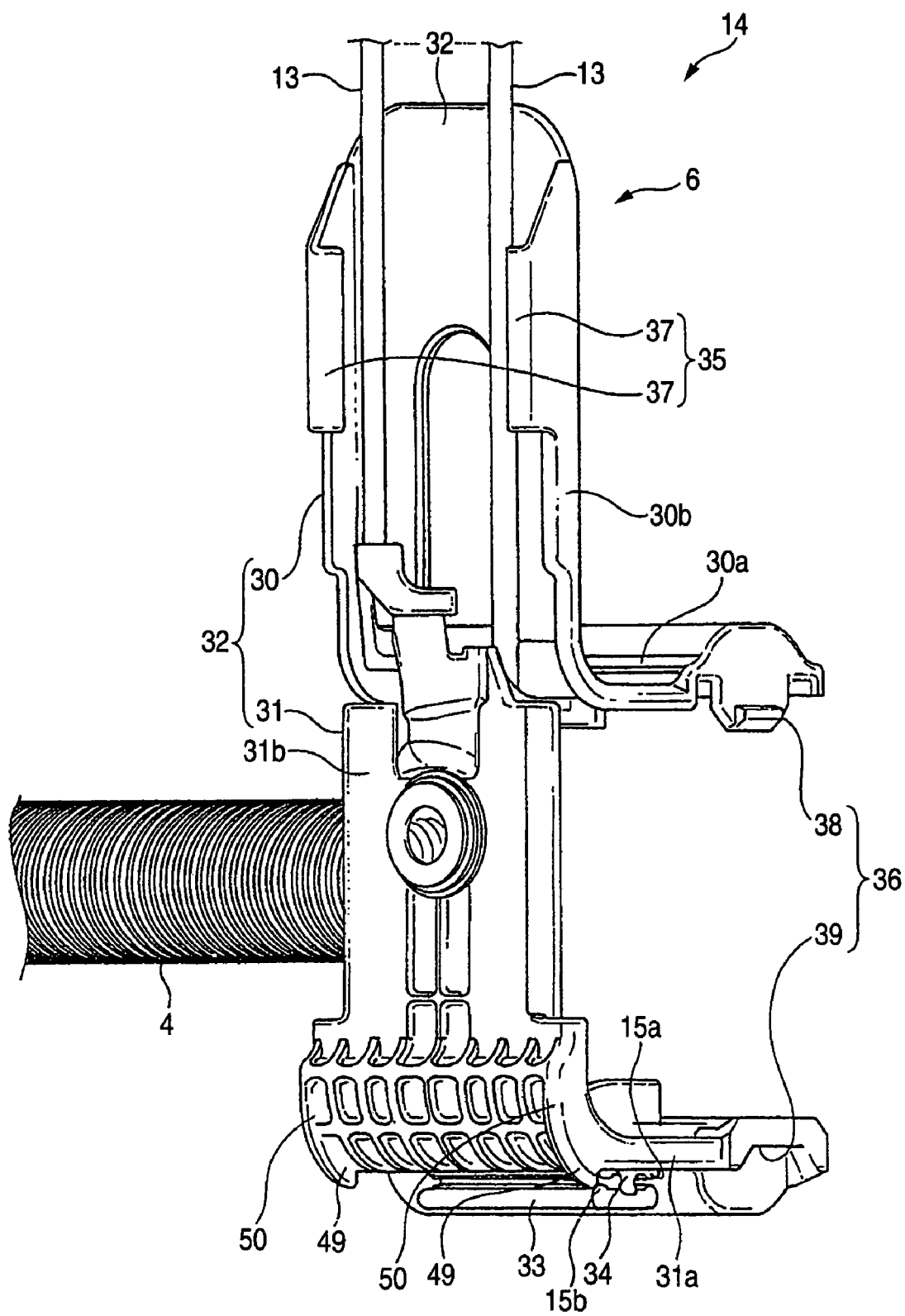
FIG. 10 is an exploded, perspective view of the protector of FIG. 9.
Figure 11:
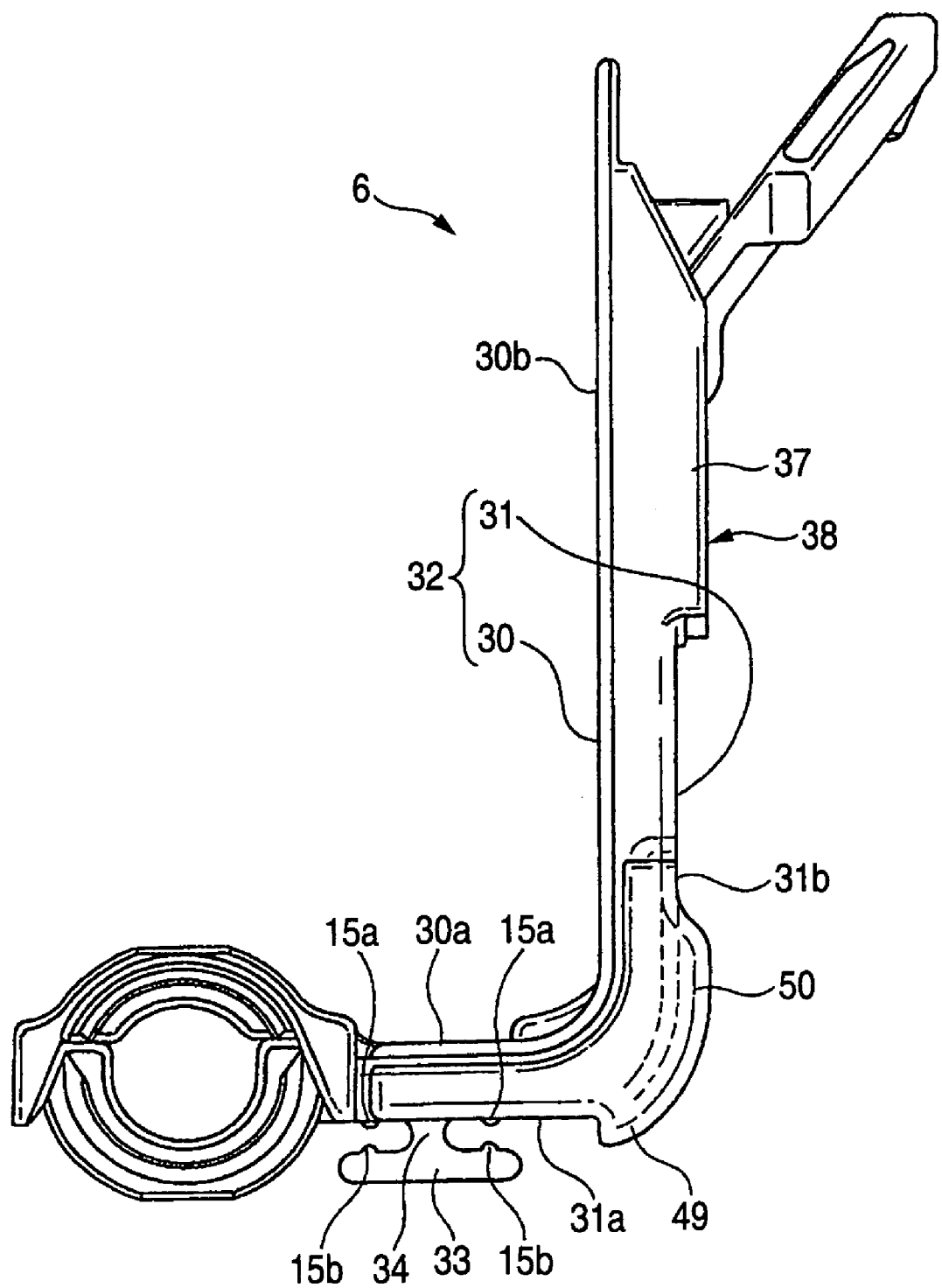
FIG. 11 is a front-elevational view of the protector of FIG. 9.

As shown in FIGS. 9 and 10, the protector 6 includes a body portion 32, a sliding contact portion 33, an interconnecting portion 34, a disengagement prevention portion 35, a fixing portion 36, two pairs of convex portions 15a and 15b, projecting portions 49, and second projecting portions 50. When the sliding contact portion 33 intrudes into the interior of the rail 11, the body portion 32 is disposed above the rail 11. The body portion 32 includes a protector body 30, and a lid member 31 attached to the protector body 30. Both of the protector body 30 and the lid member 31 (that is, the protector 6) have an L-shaped when viewed from the front side, as shown in FIG. 3.

The protector body 30 is made of an insulative synthetic resin, and includes a parallel portion 30a, and the vertical portion 30b bent at one edge of the parallel portion 30a and extending therefrom as shown in FIGS. 9 and 10, the two portions 30a and 30b being formed integrally with each other. The parallel portion 30a has a flat plate-like shape, and is disposed parallel to the lower casing 9 and the upper casing 10. The vertical portion 30b is continuous with the edge of the parallel portion 30a, and extends from the parallel portion 30a to pass between the pair of laces 7a and 7b, and further extends toward the seat 3, and therefore projects beyond the casing portion 5 toward the seat 3.

The protector body 30 (that is, the parallel portion 30a and the vertical portion 30b) has a generally trough-like shape over the entire length thereof.

The lid member 31 is made of an insulative synthetic resin, and includes a parallel portion 31a, and the vertical portion 31b bent at one edge of the parallel portion 30a and extending therefrom as shown in FIGS. 9 and 10, the two portions 31a and 31b being formed integrally with each other. The parallel portion 31a has a flat plate-like shape, and is disposed parallel to the lower casing 9 and the upper casing 10. The vertical portion 31b is continuous with the edge of the parallel portion 31a, and extends from the parallel portion 31a to pass between the pair of laces 7a and 7b, and further extends toward the seat 3, and therefore projects beyond the casing portion 5 toward the seat 3.

The lid member 31 (that is, the parallel portion 31a and the vertical portion 31b) has a flat plate-like shape over the entire length thereof.

The protector body 30 and the lid member 31 are attached to each other in such a manner that the parallel portions 30a and 31a are superposed together and that the vertical portions 30b and 31b are superposed together. In this condition, the parallel portion 31a of the lid member 31 is disposed closer to the floor 2 than the parallel portion 30a of the protector body 30 is, and the vertical portion 31b of the lid member 31 is disposed closer to the lace 7b than the vertical portion 30b of the protector body 30 is.

The lid member 31 is attached to the protector body 30 in such a manner that this lid member 13 closes a space between a pair of side plates of the protector body 30. The other end portion of the corrugated tube 4 close to the seat 3 is fixedly held between those end portions of the parallel portions 30a and 31a (of the protector body 30 and the lid member 31) apart from the vertical portions 30b and 31b.

The parallel portions 30a and 31a form one end portions of the protector body 30 and lid member 31, respectively. The vertical portions 30b and 31b form the other end portions of the protector body 30 and lid member 31, respectively.

As shown in FIGS. 3, 9 and 10, the sliding contact portion 33 is formed into a relatively-thick flat plate-like shape. The sliding contact portion 33 intrudes into the interior of the rail 11, with its opposite sides (i.e., upper and lower surfaces) disposed parallel to the surface of the bottom plate portion 11a. The sliding contact portion 33 is inserted into the interior of the rail 11 through the notch 48 formed in the one end portion 11c of the rail 11. When the sliding contact portion 33 intrudes into the interior of the rail 11, this sliding contact portion 33 is supported on the rail 11 so as to move in the longitudinal direction of the rail 11 (that is, in the direction of arrow K).

The interconnecting portion 34 has a flat plate-like shape, and is continuous at its one end with the parallel portion 31a of the lid member 31, and is continuous at the other end with the sliding contact portion 33. Opposite sides (surfaces) of the interconnecting portion 34 are parallel to the direction of arrow J.

The disengagement prevention portion 35 is provided at that end portion of the vertical portion 30b (of the protector body 30) apart from the parallel portion 30a. The disengagement prevention portion 35 includes a pair of extension walls 37 as shown in FIG. 10 and others. The pair of extension walls 37 are formed respectively at opposite side edges of the vertical portion 30b of the protector body 30, and extend respectively from the opposite side edges of the vertical portion 30b toward each other. The pair of extension walls 37 of the disengagement prevention portion 35 hold the lid member 31 to prevent this lid member 31 from being disengaged from the body portion 32, that is, from the protector body 30.

As shown in FIG. 10, the fixing portion 36 includes a retaining claw 38 formed on the parallel portion 30a of the protector body 30, and a retaining reception hole 39 formed in the parallel portion 31a of the lid member 31. Thus, the fixing portion 36 is provided at the parallel portions 30a and 31a of the protector body 30 and lid member 31.

The retaining claw 38 extends from the parallel portion 30a of the protector body 30 toward the parallel portion 31a of the lid member 31. The retaining reception hole 39 extends through the parallel portion 31a of the lid member 31, and the retaining claw 38 is retainingly engaged in this retaining reception hole 39. In the fixing portion 36, the retaining claw 38 is inserted into the retaining reception hole 39, and is retainingly engaged in this hole 39, thereby fixing the parallel portion 30a of the protector body 30 and the parallel portion 31a of the lid member 31 to each other.

As shown in FIG. 3, the interconnecting portion 34 is disposed between the two pairs of convex portions 15a and 15b. The convex portions 15a out of these convex portions 15a and 15b are formed on the parallel portion 31a of the lid member 31 (that is, the protector 6), and project (in a convexly bulged manner) therefrom respectively toward those portions of the hook walls 11b of the rail 11 disposed parallel to the bottom plate portion 11a. The convex portions 15a extend linearly in the direction of arrow K (that is, in the longitudinal direction of the rail 11) as shown in FIGS. 9 and 10. A surface of the convex portion 15a has a transverse cross-section (through a plane perpendicular to the direction of arrow K) whose shape is convexly curved, that is, bulging from the parallel portion 31a of the lid member 31 (that is, the protector 6) toward the portion of the hook wall 11b of the rail 11 disposed parallel to the bottom plate portion 11a. In the illustrated example, the surface of the convex portion 15a has the arc-shaped cross-section through the plane perpendicular to the direction of arrow K.

The other convex portions 15b of the two pairs of convex portions 15a and 15b are formed on the flat plate portion of the sliding contact portion 33 (that is, the protector 6), and project (in a convexly bulged manner) therefrom respectively toward those portions of the hook walls 11b of the rail 11 disposed parallel to the bottom plate portion 11a. The convex portions 15b extend linearly in the direction of arrow K (that is, in the longitudinal direction of the rail 11) as shown in FIGS. 9 and 10. A surface of the convex portion 15b has a transverse cross-section (through a plane perpendicular to the direction of arrow K) whose shape is convexly curved, that is, bulging from the flat plate portion of the sliding contact portion 33 (that is, the protector 6) toward the portion of the hook wall 11b of the rail 11 disposed parallel to the bottom plate portion 11a. In the illustrated example, the surface of the convex portion 15b has the arc-shaped cross-section through the plane perpendicular to the direction of arrow K.

Each pair of convex portions 15a and 15b hold the portion of the corresponding hook wall 11b of the rail 11, disposed parallel to the bottom plate portion 11a, therebetween in the direction of arrow J. Each pair of convex portions 15a and 15b are held in contact with the portion of the corresponding hook wall 11b of the rail 11 disposed parallel to the bottom plate portion 11a. The convex portions 15a and 15b project in the direction of arrow J.

Thus, the two pairs of convex portions 15a and 15b are spaced from each other. The rail 11 is disposed between each pair of convex portions 15a and 15b. The two pairs of convex portions 15a and 15b project in a convexly bulged manner from the protector 6, and are held in contact with the rail 11, and extend linearly in the direction of arrow K.

The convex portions 15a and 15b are held in contact with the rail 11 as described above, and therefore the rail 11 and the protector 6 are disposed in contact with each other.

The projecting portions 49 project from that end portion (indicated in broken lines in FIG. 11) of the parallel portion 31a of the lid member 31 (of the body portion 32), disposed close to the vertical portion 31b, toward the bottom plate portion 9a of the lower casing 9. When the protector 6 is mounted on the rail 11, the projecting portions 49 are disposed between the inner edge wall 9b of the lower casing 9 of the casing portion 5 and the rail 11.

The second projecting portions 50 project from that end portion (indicated by broken lines in FIG. 11) of the vertical portion 31b of the lid member 31 (of the body portion 32), disposed close to the parallel portion 31a, toward the inner edge wall 9b of the lower casing 9. In the illustrated example, the projecting portions 49 are formed integrally with the second projecting portions 50, respectively.

In the protector 6 of the above construction, the wires 13 within the corrugated tube 4, held between the parallel portion 30a of the protector body 30 and the parallel portion 31a of the lid member 31, are accommodated between the protector body 30 and the lid member 31. The body portion 32, that is, the protector 6, guides the wires 13 from the inside of the casing portion 5 to the seat 3 through the slit 25.

The protector 6 of the above construction is assembled as follows. First, the lid member 31 and the protector body 30 are disposed in spaced relation to each other in such a manner that the parallel portions 30a and 31a are disposed parallel to each other while the vertical portions 30b and 31b are disposed parallel to each other. Then, the other end portion of the corrugated tube 4 is disposed between the parallel portions 30a and 31a, and the wires 13 are guided toward the seat 3 through the inside of the protector body 30.

Thereafter, the vertical portion 31b of the lid member 31 is disposed generally in registry with the vertical portion 30b of the protector body 30 by the pair of extension walls 37, and the lid member 31 is slid relative to the protector body 30 in a direction to move the parallel portion 31a toward the parallel portion 30a, while the vertical portion 31b of the lid member 31 is guided by the pair of extension walls 37 in opposed relation to the vertical portion 30b of the protector body 30. Then, the vertical portion 31b of the lid member 31 is brought into facing relation to the vertical portion 30a of the protector body 30 through the pair of extension walls 37, and the retaining claw 38 is retainingly engaged in the retaining reception hole 39, thereby assembling the protector 6 as shown in FIG. 9. The sliding contact portion 33 of the thus assembled protector 6 is inserted into the interior of the rail 11 through the notch 48 formed in the one end portion 11c of the rail 11, and the protector 6 is mounted on the rail 11.

A strap or the like (not shown) is connected to the protector 6 of the above construction and the seat 3. Therefore, the protector 6 is movable in the longitudinal direction of the casing portion 5 (that is, in the direction of arrow K), and also can be interlockingly moved to the seat 3 in the direction of arrow K when the protector 6 is pulled by the seat 3 through the strap. The other end portion of the corrugated tube 4 is fixed to the tube fixing portion 14, and the wires 13 are accommodated between the protector body 30 and the lid member 31, and in this manner the wires 13 are mounted on the protector 6.

An end portion of a mat 28, laid over the floor 2, is press-fitted in a gap between the lace 7a and the upper casing 10 (that is, the casing portion 5) of the wiring apparatus 1. The end portion of the mat 28 is fixed to at least one of the lace 7a and the upper casing 10.

In this embodiment, the rail 11 divides the interior of the casing portion 5 into the wire moving space 40 and the wire accommodating space 41. Therefore, the wires 13 (that is, the corrugated tube 41) are prevented from moving between the wire moving space 40 and the wire accommodating space 41. Therefore, the corrugated tube 4 (that is, the wires 13) is prevented from catching the protector 6 or other.

The rail 11 is separate from the lower casing 9 and upper casing 10 of the casing portion 5, and therefore the rail 11 can be kept to high dimensional accuracy.

The portion 9c of the bottom plate portion 9a of the lower casing 9 on which the rail 11 is mounted is disposed closer to the seat 3 than the other portion thereof is. Therefore, a foreign matter, intruding into the interior of the casing portion 5 through the slit 25, is located at the other portion of the bottom plate portion 9a without fail. This prevents a situation in which the foreign matter, intruding into the interior of the casing portion 5, prevents the movement of the protector 6.

The projecting portions 49 of the protector 6 are disposed between the rail 11 and the inner edge wall 9b of the lower casing 9 of the casing portion 5, and project toward the bottom plate portion 9a. Therefore, a foreign matter which intrudes into the interior of the casing portion 5, and tends to intrude between the protector 6 and the rail 11 interferes with the projecting portion 49. Therefore, the foreign matter, intruding into the interior of the casing portion 5, is prevented from being held between the protector 6 and the rail 11, and this positively prevents a situation in which the movement of the protector 6 is prevented.

The second projecting portions 50 of the protector 6 project toward the inner edge wall 9b of the lower casing 9 of the casing portion 5. Therefore, a foreign matter, intruding into the interior of the casing portion 5 through the slit 25, interferes with the second projecting portion, and is positively kept away from the protector 6. This more positively prevents a situation in which the foreign matter, intruding into the interior of the casing portion 5, prevents the movement of the protector 6.

The distance D between the rail 11 and the edge portion 10c of the upper casing 10 of the casing portion 5 is smaller than the outer diameter R of the corrugated tube 4, and therefore the corrugated tube 4 (that is, the wires 13) is positively prevented from moving between the wire moving space 40 and the wire accommodating space 41. Therefore, the corrugated tube 4 (that is, the wires 13) is prevented from catching the protector 6 or other.

The superposing portions 44 and 45 of the lower casing 9 and upper casing 10 divide the wire accommodating space 41 into the first space 46 and the second space 47. Therefore, the corrugated tube 4 (that is the wires 13) within the wire accommodating space 41 is prevented from being displaced in the direction of the width of the rail 11 to move between the first space 46 and the second space 47. Therefore, the corrugated tube 4 (that is, the wires 13) is prevented from being entangled within the wire accommodating space 41, thereby positively preventing the corrugated tube 4 (that is, the wires 13) from being damaged.

The spaced-apart portions 42 and the closer portions 43 are alternately formed on the top wall portion 10a of the upper casing 10, and therefore the rigidity of the upper casing 10 (that is, the casing portion 5) is enhanced.

The notch 48 is formed in the one end portion 11c of the rail 11. Therefore, the protector 6 can be easily mounted on the rail 11 through the notch 48. And besides, the notch 48 is formed in one of the widthwise-spaced opposite side edge portions of the rail 11, and therefore the remaining portion of the rail 11 can prevent the movement of sand and a liquid such as water.

The slit 25 and the rail 11 are offset with each other in the direction of the width of the rail 11. Therefore, a foreign matter, intruding into the interior of the casing portion 5 through the slit 25, is prevented from being superposed on the rail 11. This still more positively prevents a situation in which the foreign matter, intruding into the interior of the casing portion 5, prevents the movement of the protector 6.

Even when a foreign matter such as a walking stick intrudes into the interior of the casing portion 5 through the slit 25, this foreign matter is prevented from coming into contact with the rail 11, and therefore the rail 11 is prevented from being deformed or broken.

Figure 12:
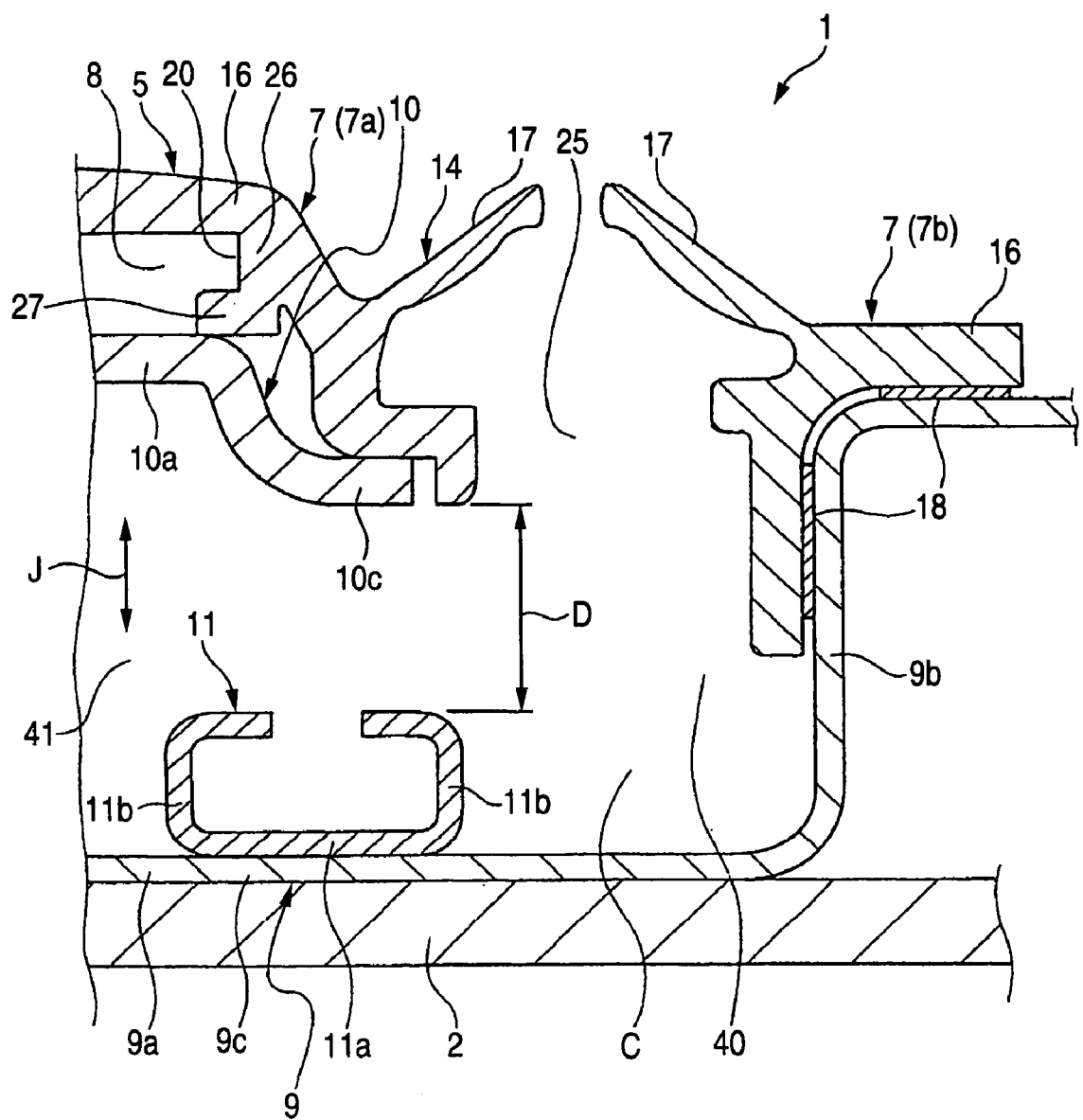
FIG. 12 is a cross-sectional view showing an important portion of a modified example of the slide wiring apparatus of FIG. 3.

In the above embodiment, the portion 9c of the bottom plate portion 9a of the lower casing 9 on which the rail 11 is mounted is disposed closer to the seat 3 than the other portion thereof is. In the invention, however, a portion 9c of a bottom plate portion 9a of a lower casing 9 on which a rail 11 is mounted can be disposed flush with the other portion thereof as shown in FIG. 12. In FIG. 12, those portions identical to those of the above embodiment are designated by identical reference numerals, respectively, and explanation thereof is omitted.

Figure 13:
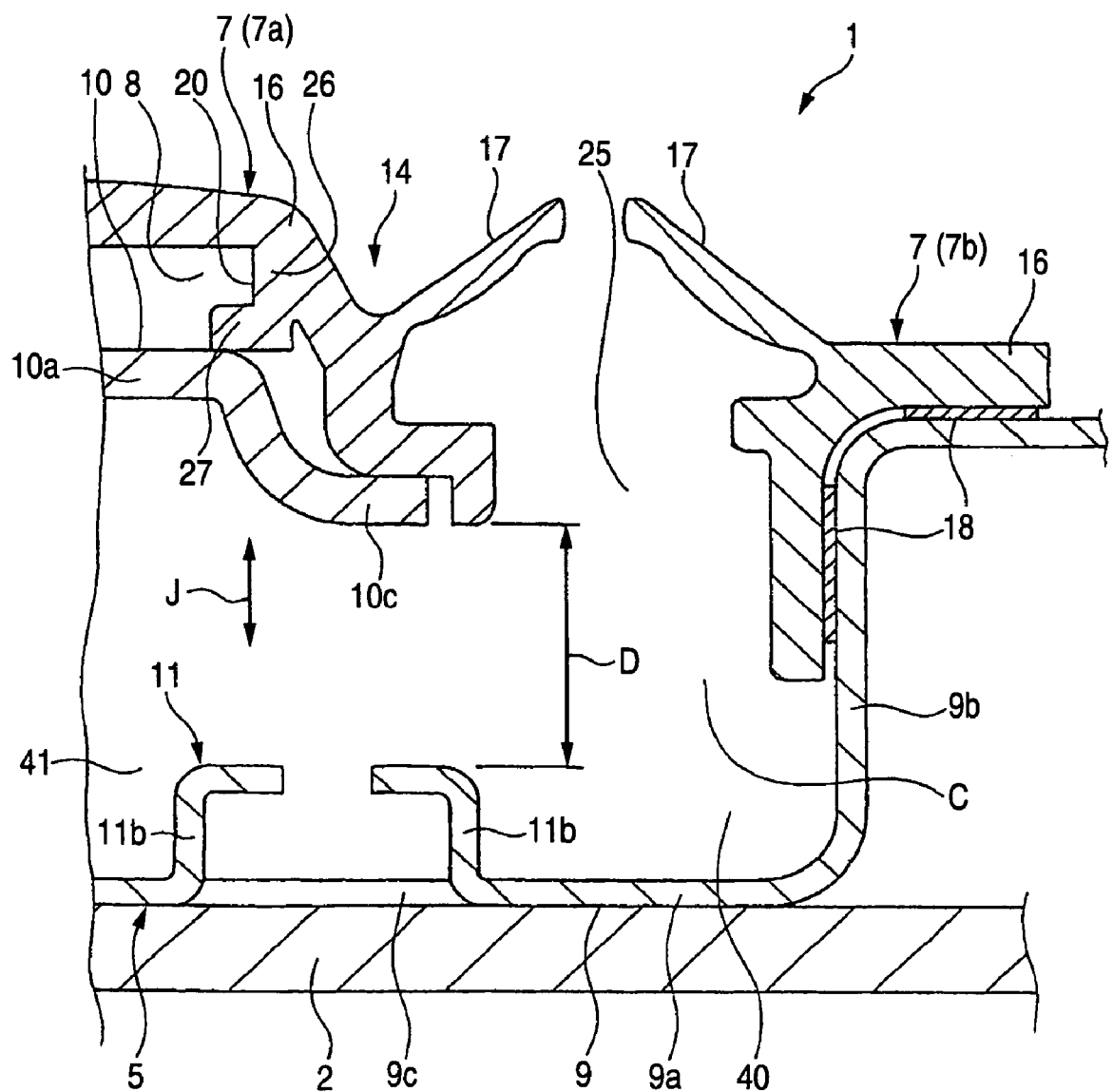
FIG. 13 is a cross-sectional view showing an important portion of another modified example of the slide wiring apparatus of FIG. 3.

In the above embodiment, the rail 11 is separate from the lower casing 9 (that is, the casing portion 5). In the invention, however, a rail 11 can be formed integrally with a lower casing 9 (that is, a casing portion 5) as shown in FIG. 13. In FIG. 13, those portions identical to those of the above embodiment are designated by identical reference numerals, respectively, and explanation thereof is omitted.

Figure 14:
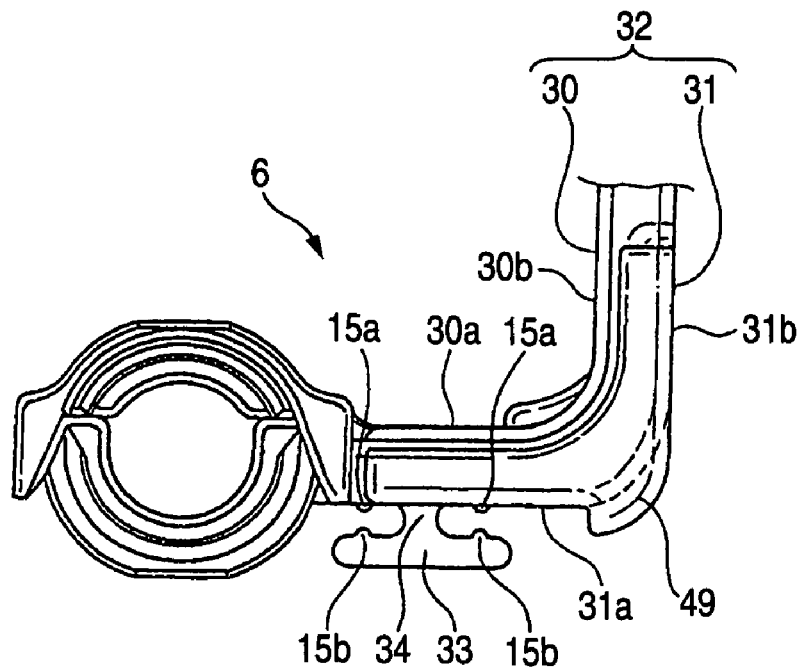
FIG. 14 is a front-elevational view showing an important portion of a modified example of the protector of FIG. 11.

In the above embodiment, the projecting portions 49 and the second projecting portions 50 are provided on the protector 6. In the invention, however, only projections 49 can be provided on a protector 6, thus omitting the provision of second projecting portions 50, as shown in FIG. 14. In FIG. 14, those portions identical to those of the above embodiment are designated by identical reference numerals, respectively, and explanation thereof is omitted.

Figure 15:
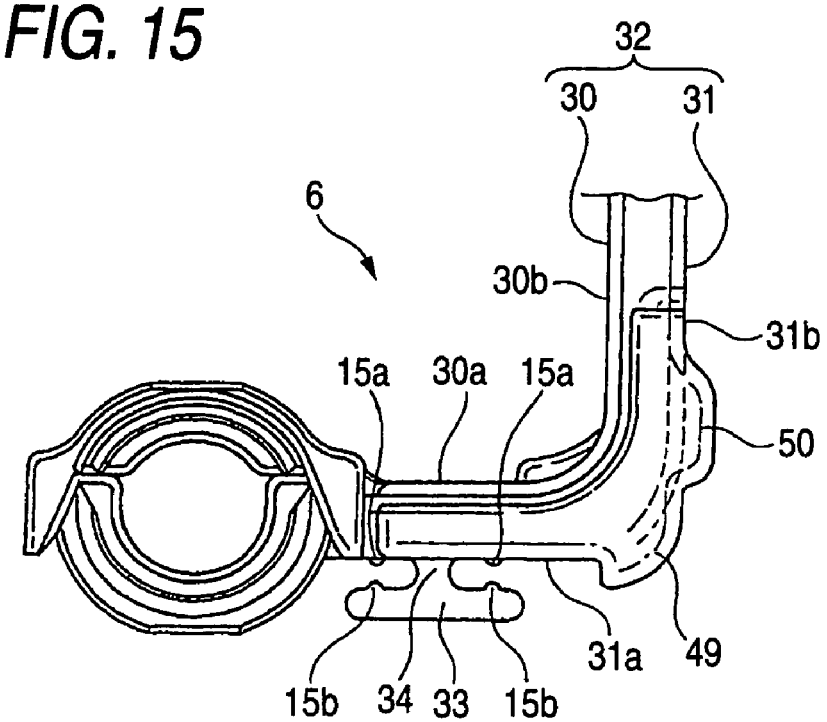
FIG. 15 is a front-elevational view showing an important portion of another modified example of the protector of FIG. 11.

In the above embodiment, the projecting portions 49 are formed integrally with the second projecting portions 50. In the invention, however, projecting portions 49 can be separate from second projecting portions 50, respectively, as shown in FIG. 15. In FIG. 15, those portions identical to those of the above embodiment are designated by identical reference numerals, respectively, and explanation thereof is omitted.

In the above embodiment, the superposing portions 44 and 45 are provided on the lower casing 9 and the upper casing 10, respectively. In the invention, however, the provision of the superposing portions 44 and 45 can be omitted as shown in FIG. 16. In FIG. 16, those portions identical to those of the above embodiment are designated by identical reference numerals, respectively, and explanation thereof is omitted.

In the above embodiment, the spaced-apart portions 42 and the closer portions 43 are alternately formed on the top wall portion 10a of the upper casing 10 in the longitudinal direction thereof. In the invention, however, only a closer portion 43 can be formed on a top wall portion 10a of an upper casing 10 as shown in FIG. 17. In FIG. 17, those portions identical to those of the above embodiment are designated by identical reference numerals, respectively, and explanation thereof is omitted.

In the above embodiment, the slit 25 and the rail 11 are offset with each other in the direction of the width of the rail 11. In the invention, however, a slit 25 and a rail 11 may not be offset with each other in a direction of a width of the rail 11 as shown in FIG. 18. In FIG. 18, those portions identical to those of the above embodiment are designated by identical reference numerals, respectively, and explanation thereof is omitted.

In the above embodiment, by sliding the lace 7a relative to the casing portion 5 in the direction of arrow K perpendicular to the direction of arrow J, the lace 7a is fixed to the casing portion 5. In the invention, however, the lace 7a can be fixed to the casing portion 5 by sliding the lace 7a in a direction which is perpendicular to the direction of arrow J, and intersects the direction of arrow K.

In the above embodiment, the one lace 7a is fixed to the casing portion 5 by the fixing mechanism 8. In the invention, however, the other lace 7b can be fixed to the casing portion 5 by the fixing mechanism 8. Namely, in the invention, at least one of the plurality of laces 7a and 7b need to be fixed to the casing portion 5 by the fixing mechanism 8.

The wires 13 are installed over the region including the floor 2 (serving as the vehicle body) and the seat 3 (serving as the slide member) slidable relative to the floor 2. In the invention, however, the wires 13 can be installed over a region including a body panel (serving as a vehicle body) and a door slidable relative to the body panel, or the wires 13 can be installed over a region including a roof panel (serving as a vehicle body) and a sun roof slidable relative to the roof panel. Namely, in the invention, the wires 13 need only to be installed over a region including the vehicle body and the slide member slidable relative to the vehicle body.

The above embodiment merely illustrates the representative form of the invention, and the invention is not limited to the above embodiment. Various modifications can be made without departing from the subject matter of the invention

What is claimed is:

1. A slide wiring apparatus for installing a wire between a vehicle body of an automobile and a slide member slidably mounted on the vehicle body, comprising:
   a casing portion for being mounted on said vehicle body;
   a rail mounted in an inside of said casing portion;
   a slit formed in said casing portion so as to extend in a longitudinal direction of said rail; and
   a slider supported on said rail so as to be slidably movable in the longitudinal direction of said rail, and being interlockingly movable to said slide member, wherein said wire is mounted on said slider so tat said slider guides said wire from the inside of said casing portion to said slide member through said slit;
   wherein a space within said casing portion is divided by said rail into a wire moving space disposed close to said slit and a wire accommodating space apart from said slit, and said wire interlockingly moves in said wire moving space to said slide member, and said wire is accommodated in said wire accommodating space,
   wherein said rail is mounted on a bottom surface of said casing portion, and
   wherein said slit and said rail are offset with each other in a width direction of said rail.

2. A slide wiring apparatus according to claim 1, wherein said rail is separate from said casing portion.

3. A slide wiring apparatus according to claim 2, wherein a portion of said bottom surface on which said rail is mounted projects beyond another portion thereof toward said slide member.

4. A slide wiring apparatus according to claim 1, wherein said slider includes:
   a body portion which holds said wire, and guides said wire from the inside of said casing portion to said slide member through said slit; and
   a projecting portion which is disposed between an inner wall surface of said casing portion and said rail, and projects from said body portion toward the bottom surface of said casing portion.

5. A slide wiring apparatus according to claim 4, wherein said slider includes a second projecting portion projecting from said body portion toward said inner wall surface of said casing portion.

6. A slide wiring apparatus according to claim 1, wherein a distance between a portion of an inner surface of said casing portion and said rail is smaller than an outer diameter of said wire.

7. A slide wiring apparatus according to claim 1, wherein said casing portion Includes a lower casing for being mounted on said vehicle body, and an upper casing attached to said lower casing; and
   each of said lower casing and said upper casing have a superposing portion with which said upper casing and said lower casing are superposed and fixed to each other, and said superposing portions divide said wire accommodating space into a first space close to said wire moving space and a second space.

8. A slide wiring apparatus according to claim 7, wherein spaced-apart portions and closer portions are alternately formed on an outer wall of said upper casing in the longitudinal direction of said rail, and said space-apart portions are spaced apart from said vehicle body, while said closer portions are disposed closer to said vehicle body than said spaced-apart portions are.

9. A slide wiring apparatus according to claim 1, wherein a notch is formed in one of opposite side edge portions of said rail at one end portion thereof.

* * * * *